US012603510B2

(12) United States Patent
Tamaru et al.

(10) Patent No.: US 12,603,510 B2
(45) Date of Patent: Apr. 14, 2026

(54) REVERSE FLOW POWER CONTROL DEVICE AND REVERSE FLOW POWER CONTROL METHOD

(71) Applicant: TOSHIBA ENERGY SYSTEMS & SOLUTIONS CORPORATION, Kawasaki (JP)

(72) Inventors: Shingo Tamaru, Kawasaki Kanagawa (JP); Kazuto Kubota, Tokyo (JP); Takashi Akiba, Kawasaki Kanagawa (JP); Fumiyuki Yamane, Kawasaki Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 397 days.

(21) Appl. No.: 18/336,572

(22) Filed: Jun. 16, 2023

(65) Prior Publication Data

US 2023/0409067 A1 Dec. 21, 2023

(30) Foreign Application Priority Data

Jun. 21, 2022 (JP) ................................. 2022-099728

(51) Int. Cl.
H02J 3/466 (2026.01)
G05F 1/66 (2006.01)
(Continued)

(52) U.S. Cl.
CPC ................ H02J 3/466 (2020.01); G05F 1/66 (2013.01); H02J 3/381 (2013.01); H02J 3/48 (2013.01); H02J 2101/20 (2026.01)

(58) Field of Classification Search
CPC ...... H02J 3/381; H02J 3/32; H02J 3/38; H02J 3/466; H02J 7/35; H02J 7/485; G05F 1/66; G05F 1/33
(Continued)

(56) References Cited

U.S. PATENT DOCUMENTS

| | | | |
|---|---|---|---|
| 10,931,112 B1 * | 2/2021 | Matsuo ..................... | H02J 3/24 |
| 2002/0067628 A1 | 6/2002 | Takehara et al. | |

(Continued)

FOREIGN PATENT DOCUMENTS

| | | |
|---|---|---|
| JP | 63-239513 A | 10/1988 |
| JP | 2002-204531 A | 7/2002 |

(Continued)

OTHER PUBLICATIONS

Japan Patent Office, Decision to Grant a Patent in JP App. No. 2022-099728 (Nov. 25, 2025).

*Primary Examiner* — Crystal J Barnes-Bullock
(74) *Attorney, Agent, or Firm* — Finnegan, Henderson, Farabow, Garrett & Dunner, LLP

(57) ABSTRACT

According to an embodiment, a reverse flow power control device includes: an input unit that accepts actual values of output power of the power conditioner, load power with respect to the load device, and reception power, and a minimum reception power value; a storage unit; and a calculator having an output controller that calculates an output command calculation value, a load controller that calculates a load command calculation value, and a command value re-calculator that calculates, by using the respective actual values, the output command calculation value, the load command calculation value, and the minimum reception power value, an output command value with respect to the power conditioner, in order to prevent a
(Continued)

reception power value from the power system from becoming less than the minimum reception power value.

8 Claims, 15 Drawing Sheets

(51) Int. Cl.
  *H02J 3/38* (2006.01)
  *H02J 3/48* (2006.01)
  *H02J 101/20* (2026.01)

(58) Field of Classification Search
  USPC ......................................................... 700/292
  See application file for complete search history.

(56) References Cited

U.S. PATENT DOCUMENTS

| | | | | |
|---|---|---|---|---|
| 2003/0197429 | A1 | 10/2003 | Takehara et al. | |
| 2012/0013192 | A1* | 1/2012 | Park .......................... | H02J 7/35 |
| | | | | 307/80 |
| 2014/0142774 | A1* | 5/2014 | Katayama .............. | G06Q 50/06 |
| | | | | 700/291 |
| 2015/0155710 | A1* | 6/2015 | Yamagaki ................. | H02J 3/38 |
| | | | | 307/18 |
| 2015/0171641 | A1* | 6/2015 | Sato ........................ | H02J 7/485 |
| | | | | 320/134 |
| 2016/0329721 | A1* | 11/2016 | Rogers ...................... | H02J 3/46 |
| 2017/0338658 | A1* | 11/2017 | Cereda ...................... | H02J 3/32 |
| 2018/0287217 | A1* | 10/2018 | Takenaka ............ | H01M 10/482 |
| 2018/0323630 | A1* | 11/2018 | Nakamura .............. | H02J 3/381 |
| 2020/0321795 | A1 | 10/2020 | Nagano | |
| 2021/0194262 | A1* | 6/2021 | Ogura ..................... | H02J 3/466 |
| 2021/0365057 | A1* | 11/2021 | Nasuno ................... | H02J 3/32 |
| 2023/0059875 | A1* | 2/2023 | Baron .................... | H02J 3/381 |
| 2023/0369889 | A1* | 11/2023 | Hamaguchi .............. | H02J 3/38 |

FOREIGN PATENT DOCUMENTS

| | | | | |
|---|---|---|---|---|
| JP | 2016-187285 A | 10/2016 | | |
| JP | 2020145921 A | * 9/2020 | .............. | G05F 1/33 |
| JP | 2020171120 A | 10/2020 | | |

* cited by examiner

Figure 2:
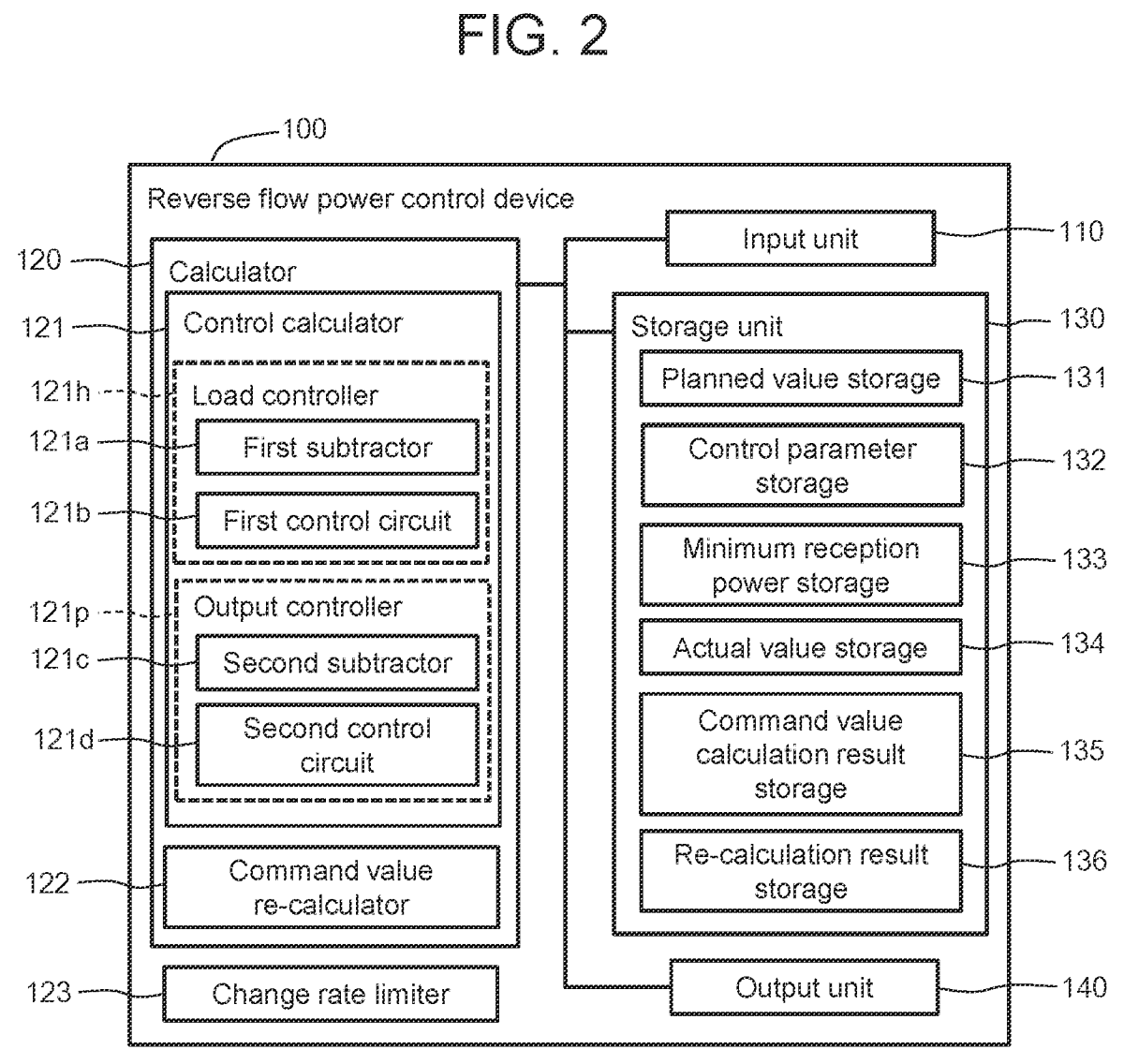

Reverse flow power control device — 100

Input unit — 110

Storage unit — 130
- Planned value storage — 131
- Control parameter storage — 132
- Minimum reception power storage — 133
- Actual value storage — 134
- Command value calculation result storage — 135
- Re-calculation result storage — 136

Output unit — 140

Calculator — 120

Control calculator — 121

Load controller — 121h
- First subtractor — 121a
- First control circuit — 121b

Output controller — 121p
- Second subtractor — 121c
- Second control circuit — 121d Command value re-calculator — 122

Change rate limiter — 123

Figure 5:
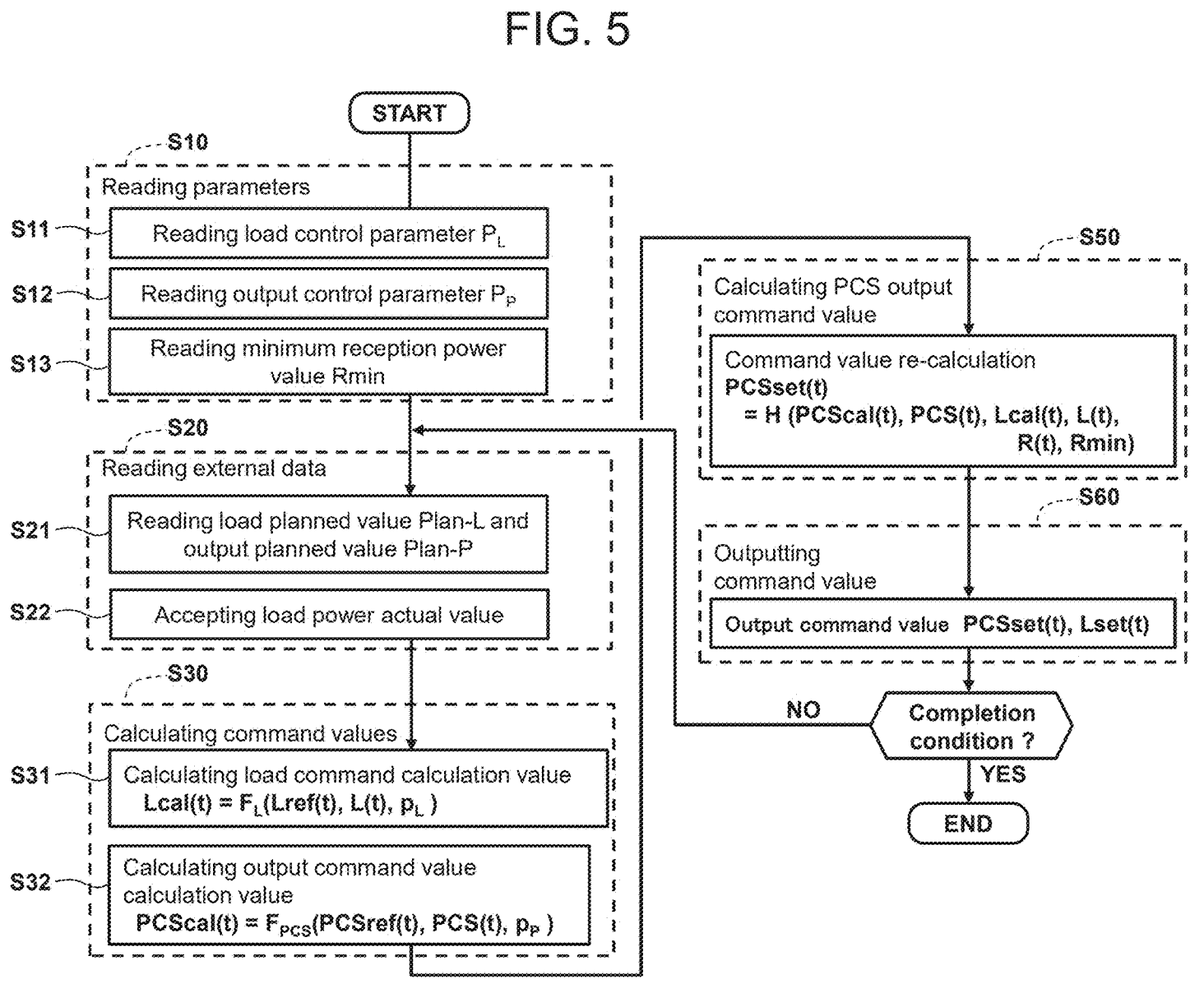

START

S10  Reading parameters

- S11 Reading load control parameter $P_L$
- S12 Reading output control parameter $P_P$
- S13 Reading minimum reception power value $Rmin$

S20  Reading external data

- S21 Reading load planned value Plan-L and output planned value Plan-P
- S22 Accepting load power actual value

S30  Calculating command values

- S31 Calculating load command calculation value
  $Lcal(t) = F_L (Lref(t), L(t), p_L)$
- S32 Calculating output command value calculation value
  $PCScal(t) = F_{PCS}(PCSref(t), PCS(t), p_P)$

S50  Calculating PCS output command value

Command value re-calculation $PCSset(t)$
$= H (PCScal(t), PCS(t), Lcal(t), L(t), R(t), Rmin)$

S60  Outputting command value

Output command value $PCSset(t), Lset(t)$

Completion condition ?

NO

YES

END

Figure 10:
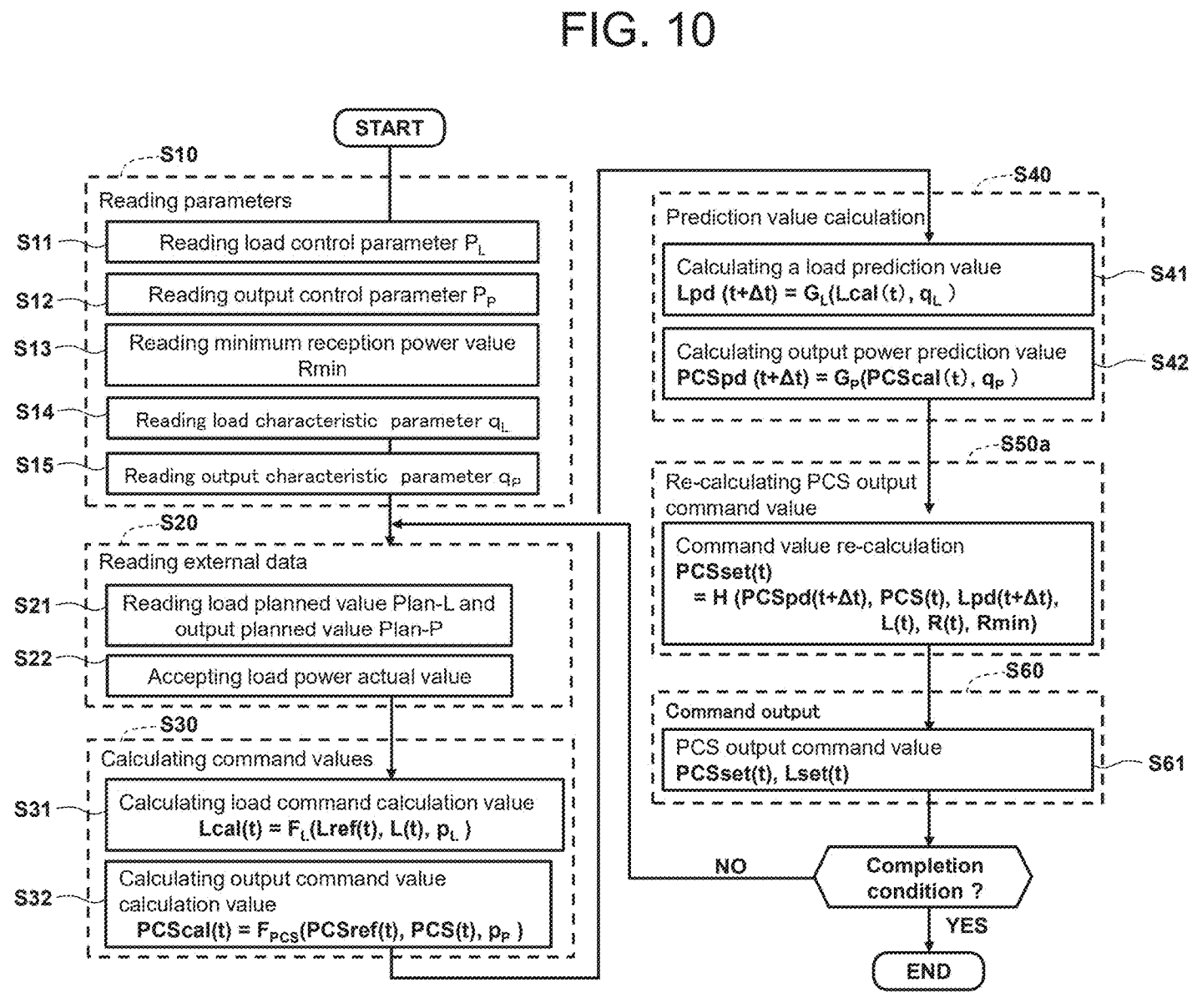

START

S10 Reading parameters

- S11 Reading load control parameter $P_L$
- S12 Reading output control parameter $P_P$
- S13 Reading minimum reception power value $R_{min}$
- S14 Reading load characteristic parameter $q_L$
- S15 Reading output characteristic parameter $q_P$

S20 Reading external data

- S21 Reading load planned value Plan-L and output planned value Plan-P
- S22 Accepting load power actual value

S30 Calculating command values

- S31 Calculating load command calculation value
  $Lcal(t) = F_L(Lref(t), L(t), p_L)$
- S32 Calculating output command value calculation value
  $PCScal(t) = F_{PCS}(PCSref(t), PCS(t), p_P)$

S40 Prediction value calculation

- S41 Calculating a load prediction value
  $Lpd(t+\Delta t) = G_L(Lcal(t), q_L)$
- S42 Calculating output power prediction value
  $PCSpd(t+\Delta t) = G_P(PCScal(t), q_P)$

S50a Re-calculating PCS output command value

- Command value re-calculation
  $PCSset(t)$
  $= H(PCSpd(t+\Delta t), PCS(t), Lpd(t+\Delta t), L(t), R(t), Rmin)$

S60 Command output

- S61 PCS output command value
  $PCSset(t), Lset(t)$

Completion condition ?

NO

YES

END

REVERSE FLOW POWER CONTROL DEVICE AND REVERSE FLOW POWER CONTROL METHOD

CROSS-REFERENCE TO RELATED APPLICATION

This application is based upon and claims the benefit of priority from Japanese Patent Application No. 2022-099728 filed on Jun. 21, 2022, the entire content of which is incorporated herein by reference.

FIELD

Embodiments of the present invention relate to a reverse flow power control device and a reverse flow power control method.

BACKGROUND

Renewable energy power plants such as large-scale photovoltaic power plant and wind power plant sell all output power to a commercial power system (referred to as a power system, hereinafter) to obtain an income. Therefore, a load in a renewable energy power plant is only power of auxiliary machine such as an air conditioner, and thus the plant does not receive power from the power system except for a time zone in which there is no output power almost at all.

In recent years, attention is focused on production of hydrogen with no $CO_2$ release by using renewable energy, and a plant is being constructed in which a large-scale hydrogen producing device is provided together with a renewable energy power generator. Such a plant has a purpose of utilizing renewable energy as self-consumption, and thus it sometimes does not conclude a contract regarding a reverse flow (power selling) to the power system. In this case, the reverse flow to the power system is prevented by constantly receiving certain power from the power system.

On the other hand, there is a method of varying a load in a plant in accordance with renewable energy. In this case, it can be considered that a control delay occurs due to a control period or a communication method, resulting in that the reverse flow occurs instantaneously. When an unintended reverse flow is made to occur, it exerts an influence on the power system, and in the worst case, occurrence of power outage or the like can also be worried.

Also in a similar plant, when a required amount of hydrogen is small, there can be considered a case where a reverse flow of a surplus of renewable energy to the power system is caused, to thereby obtain a power selling income. However, when the reverse flow to the power system is caused, there is a need to respond to an output control command requested by a general power transmission and distribution operator. When the request is issued, there is a need to make reverse flow power to be equal to or less than the output control command, but if a load in a plant is varied in accordance with the renewable energy, reverse flow power exceeding the output control command may occur instantaneously due to a control delay, which may cause a financial penalty, and if violations occur many times, the power system side may limit the reverse flow.

Hereinbelow, power to be purchased from the power system will be referred to as reception power, and power of renewable energy to be sold to the power system will be referred to as reverse flow power.

In a case where the reverse flow is likely to be actually occurred, it is possible to deal with it by using a protection function to stop power generation of renewable energy. However, if the power generation is once stopped, it may take time until the power generation is restarted, due to a confirmation operation and the like for restoration, and during the time period, it is not possible to utilize output power of renewable energy.

For this reason, an operation of causing no reverse flow while achieving a predetermined object by not a protection function but a control function, is required. Further, even if the reverse flow is allowed, when a request of output control command is issued by a general power transmission and distribution operator, an operation of suppressing reverse flow power to equal to or less than the output control command is required.

BRIEF DESCRIPTION OF THE DRAWINGS

FIG. 1 is a block diagram illustrating a relationship between a reverse flow power control device according to a first embodiment and a plant targeted by the reverse flow power control device.

FIG. 2 is a block diagram illustrating a configuration of the reverse flow power control device according to the first embodiment.

FIG. 3 is a control block diagram illustrating contents of processing performed by a reverse flow power control device according to the first embodiment.

FIG. 5 is a flow chart illustrating a procedure of the reverse flow power control method according to the first embodiment.

FIG. 9 is a control block diagram illustrating a configuration and operations of the reverse flow power control device according to the third embodiment.

FIG. 10 is a flow chart illustrating a procedure of a reverse flow power control method according to the third embodiment.

FIG. 11 is a block diagram illustrating a relationship between a reverse flow power control device according to a fourth embodiment and a plant targeted by the reverse flow power control device.

FIG. 14 is a block diagram illustrating a relationship between a reverse flow power control device according to a fifth embodiment and a plant targeted by the reverse flow power control device.

DETAILED DESCRIPTION

Figure 4:
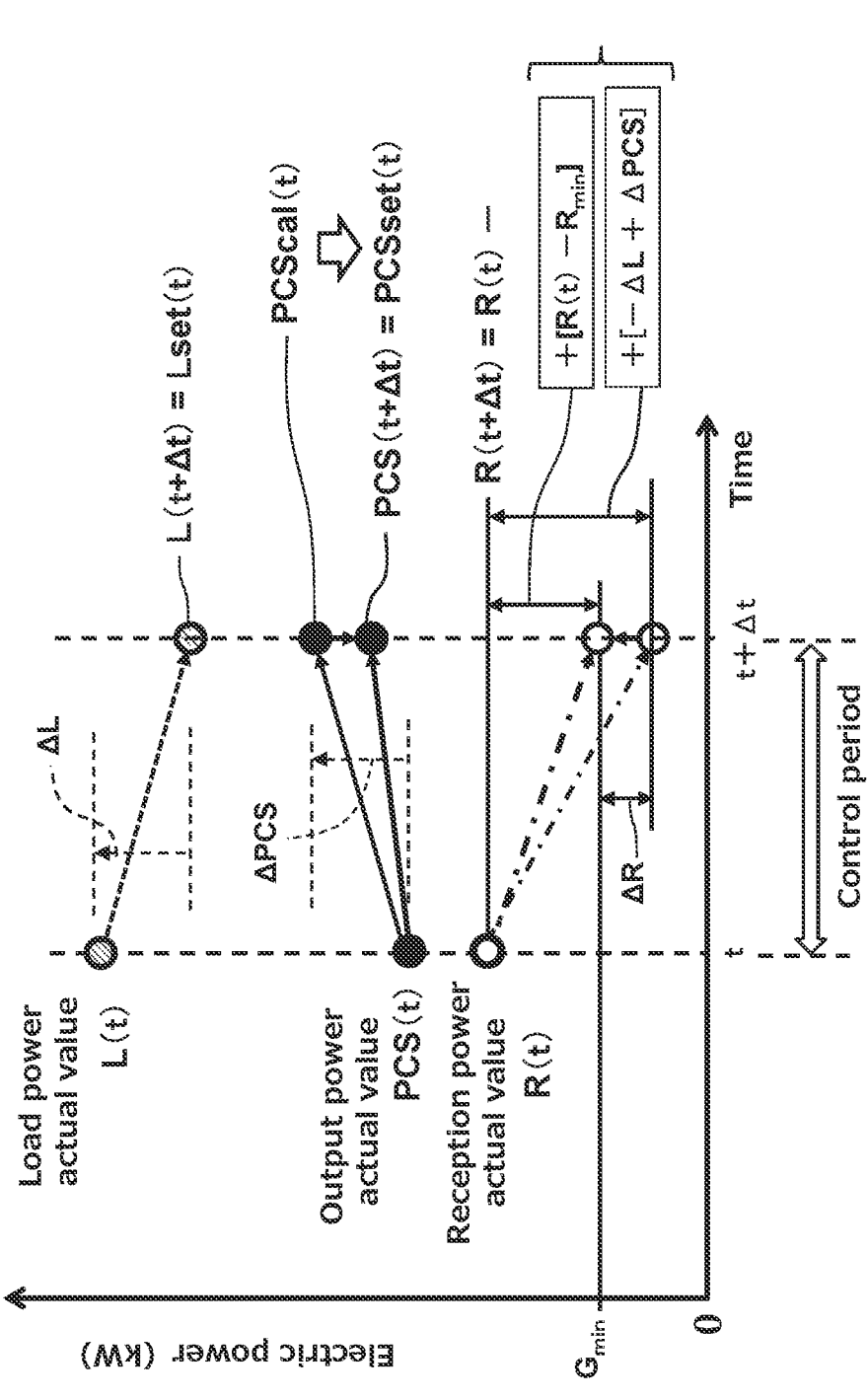
FIG. 4 is a conceptual graph for explaining details of re-calculation of an output command value in a reverse flow power control method according to the first embodiment.

A problem to be solved by the present invention is to prevent deviation from a condition regarding reverse flow power.

According to an aspect of the present invention, there is provided a reverse flow power control device that prevents occurrence of reverse flow power from a plant having a renewable energy power generating device, a power conditioner capable of adjusting output power of the renewable energy power generating device, and a load device, and connected to an external power system, to the power system, the reverse flow power control device comprising: an input unit that accepts actual values of the output power, load power supplied to the load device, and reception power received by the plant from the power system, and information including a minimum reception power value being a minimum value of the reception power; a storage unit that stores the information accepted by the input unit; a calculator that performs a calculation of command values of the output power and the load power based on the information and the respective actual values stored in the storage unit; and an output unit that outputs the command values to the load device and the power conditioner, wherein the calculator includes: an output controller that calculates an output command calculation value; a load controller that calculates a load command calculation value; a command value re-calculator that calculates, by using the respective actual values, the output command calculation value, the load command calculation value, and the minimum reception power value, an output command value with respect to the power conditioner, in order to prevent a reception power value being a value of the reception power from becoming less than the minimum reception power value; and a calculation interval adjustment part that sets a calculation interval of generating a plurality of calculation steps, regarding a dead time in the renewable energy power generating device, the power conditioner, and the load device; wherein the command value re-calculator calculates a change in the reception power value in an interval up to an end of the plurality of calculation steps in which a command value is reflected by the dead time, and calculates the output command value that prevents the reception power value from becoming less than the minimum reception power value.

Hereinafter, a reverse flow power control device and a reverse flow power control method according to an embodiment of the present invention will be described while referring to the drawings. Here, mutually the same or similar parts will be denoted by common reference signs, and an overlapped explanation will be omitted.

First Embodiment

Figure 1:
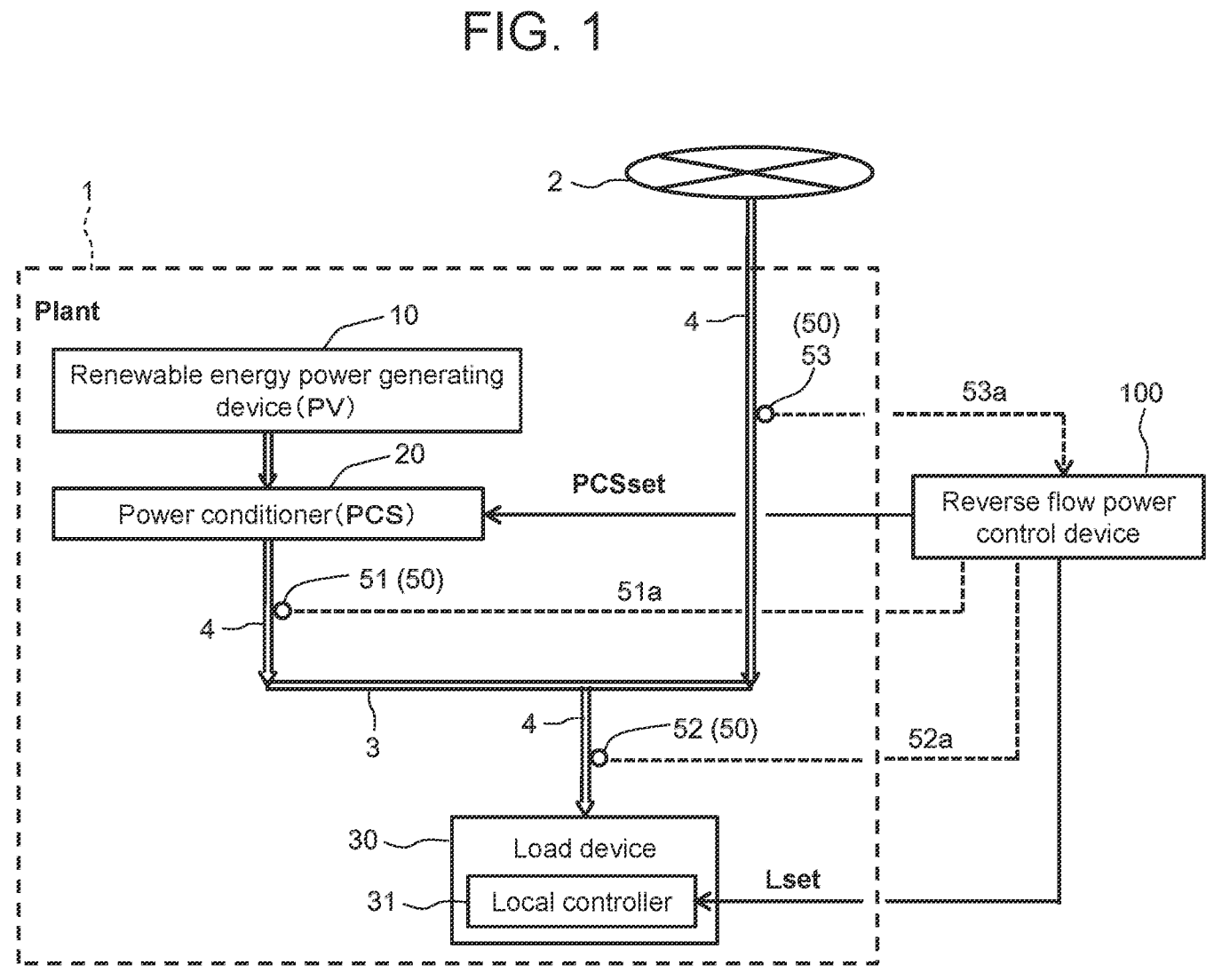

FIG. 1 is a block diagram illustrating a relationship between a reverse flow power control device 100 according to a first embodiment and a plant 1 targeted by the reverse flow power control device 100.

The plant 1 targeted by the reverse flow power control device 100 has a renewable energy power generating device ("PV") 10, a power conditioner ("PCS") 20, and a load device 30.

The PV 10 is a device that converts natural energy into electric power, which is a photovoltaic power generating device, for example, but the PV 10 is not limited to this.

The PCS 20 makes direct-current power generated in the PV 10 to be input therein to output alternating-current power, and adjusts a level of the alternating-current power to be output to a predetermined value of equal to or less than an input power level.

The load device 30 is a device that consumes power, which is a hydrogen producing facility, for example, but the load device 30 is not limited to this. The load device 30 has a local controller 31. The local controller 31 controls states of respective loads in the load device 30 according to an external load power command, so as to make power to be consumed by the load device 30, namely, load power match a load power command value.

An in-plant busbar 3 is provided in the plant 1, and the PCS 20 and the load device 30 are connected to the in-plant busbar 3 via connection lines 4, respectively. Further, the in-plant busbar 3 is connected to an external power system 2 via the connection line 4. Each connection line 4 is provided with a power meter 50. Specifically, an output power meter 51 is provided to the connection line 4 between the in-plant busbar 3 and the PCS 20, a load power meter 52 is provided to the connection line 4 between the in-plant busbar 3 and the load device 30, and a transaction power meter 53 is provided to the connection line 4 between the in-plant busbar 3 and the power system 2, by which a flow of power can be measured and monitored.

The reverse flow power control device 100 accepts outputs of the power meters 50 of the plant 1, namely, outputs from the output power meter 51, the load power meter 52, and the transaction power meter 53, respectively, as an output power actual value 51a, a load power actual value 52a, and a transaction power actual value 53a, and outputs a PCS output command value PCSset and a load command value Lset to the PCS 20 and the load device 30, respectively, of the plant 1.

FIG. 2 is a block diagram illustrating a configuration of the reverse flow power control device 100 according to the first embodiment.

The reverse flow power control device 100 has an input unit 110, a calculator 120, a storage unit 130, and an output unit 140. The reverse flow power control device 100 may also be a combination of individual devices, which is a computer system, for example.

The input unit 110 accepts not only the output power actual value 51a from the output power meter 51, the load power actual value 52a from the load power meter 52, and the transaction power actual value 53a from the transaction power meter 53 described above, but also the other external input required for control. The other external input required for control includes a control parameter of a control circuit to be described later regarding the reverse flow power control device 100, minimum reception power, and planned values of output power and load power.

The calculator 120 has a control calculator 121, a command value re-calculator 122, and a change rate limiter 123.

The control calculator 121 performs a control calculation by making the planned values of the output power and the load power, and the output power actual value 51a and the load power actual value 52a accepted by the input unit 110, to be inputted therein, thereby calculating a provisional PCS output command value and a provisional load command value. The control calculator 121 has a first subtractor 121a and a first control circuit 121b related to the load command value, and a second subtractor 121c and a second control circuit 121d related to the output command value. Note that although the present embodiment describes a case, as an example, in which the control calculator 121 performs PID control, but another control method may also be employed.

The command value re-calculator 122 performs re-calculation based on a result of the control calculation performed by the control calculator 121, to thereby calculate the PCS output command value PCSset. Details of the calculator 120 will be described later while referring to FIG. 3.

The change rate limiter 123 increases the output of the command value re-calculator 122 to the PCS 20 not rapidly but at a certain inclination, to thereby stabilize the control.

The storage unit 130 has a planned value storage 131, a control parameter storage 132, a minimum reception power storage 133, an actual value storage 134, a command value calculation result storage 135, and a re-calculation result storage 136.

The planned value storage 131 stores and houses the planned values of the load power and the output power read by the input unit 110. Here, the planned value read by the input unit 110 is a time-series value regarding a time period during which the reverse flow power control device 100 performs the control. However, it is also possible to design such that the input unit 110 sequentially reads planned values regarding a predetermined time width, and in response to this, the planned value storage 131 sequentially houses and stores the planned values.

The control parameter storage 132 houses and stores a load control parameter $P_L$ and an output control parameter $P_P$ being control parameters read by the input unit 110. Here, the control parameters are, in a case of PID control, for example, a gain, an integral time, and a derivative time.

The minimum reception power storage 133 houses and stores the minimum reception power read by the input unit 110.

The actual value storage 134 houses and stores the outputs of the power meters 50 (actual values) read by the input unit 110, namely, the output power actual value 51a, the load power actual value 52a, and the transaction power actual value 53a. These actual values to be stored may be only the values read by the input unit 110 right immediately before the calculation, but values obtained by a given plurality of times of sampling may be housed in chronological order.

The command value calculation result storage 135 stores the calculation result of the control calculator 121. The calculation result to be stored may be only the latest calculation result obtained by the control calculator 121, but the results of a plurality of times of calculation up to the last calculation may be housed in chronological order.

The re-calculation result storage 136 stores the calculation result of the command value re-calculator 122. The calculation result to be stored may be only the latest calculation result obtained by the command value re-calculator 122, but the results of a plurality of times of calculation up to the last calculation may be housed in chronological order.

The output unit 140 outputs a load command calculation value Lcal (t) being a calculation result of the control calculator 121 to the load device 30 as a load command value Lset (t), and outputs a PCS output command value PCSset (t) being a calculation result of the command value re-calculator 122 to the PCS 20.

Figure 3:
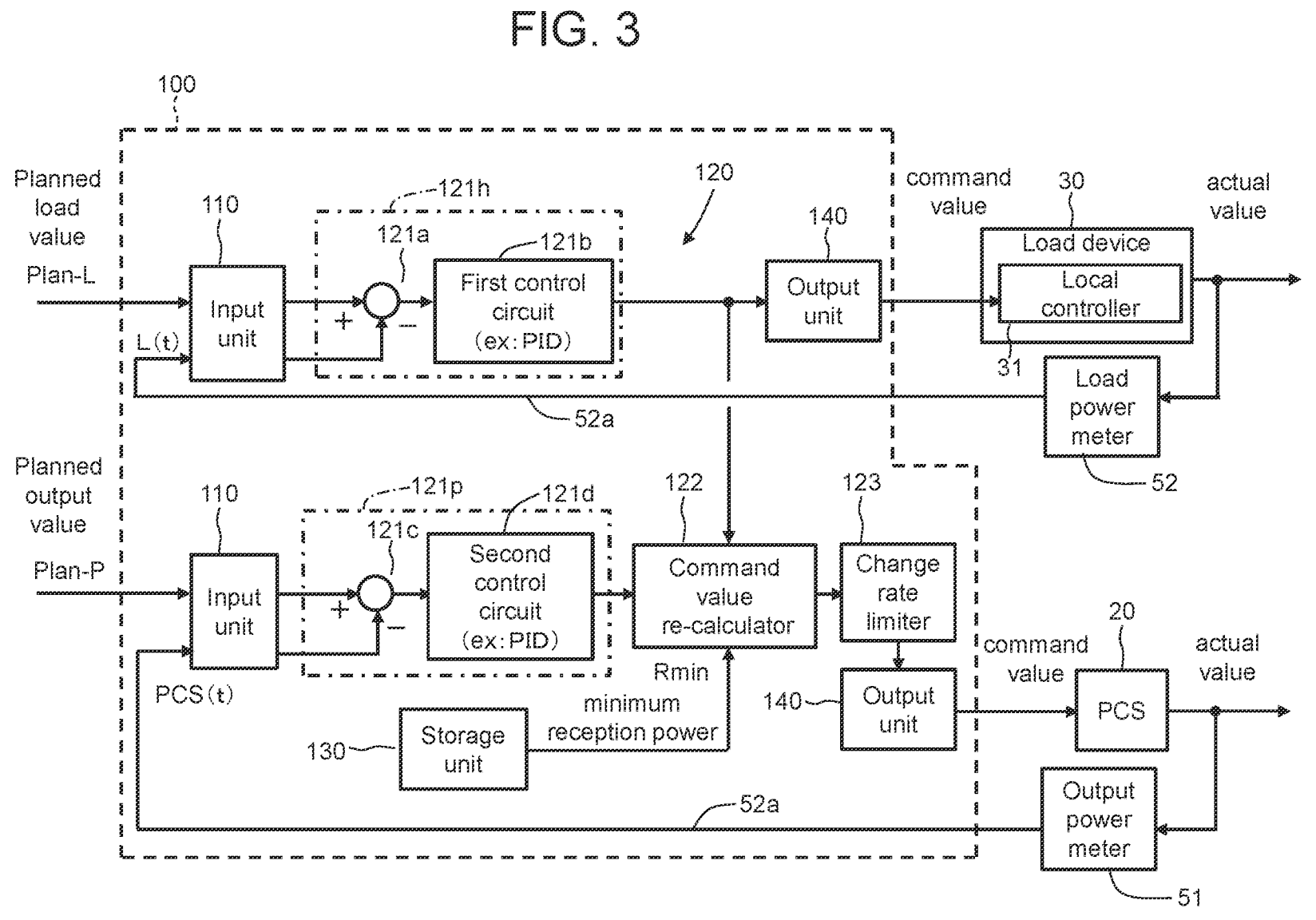

FIG. 3 is a control block diagram illustrating contents of processing performed by the reverse flow power control device 100 according to the first embodiment.

When broadly classified, the processing includes a part related to a command with respect to the load device 30, and a part related to a command with respect to the PCS 20.

The part related to the command with respect to the load device 30 is as follows.

The input unit 110 accepts a load planned value Plan-L being a planned value of the load power, and L (t) being the load power actual value 52a from the load power meter 52. Here, the value of the load planned value Plan-L is stored in the planned value storage 131, and used as a reference value Lref (t) of the load power at each time point. A load controller 121h of the control calculator 121 calculates, based on these signals, the load command calculation value Lcal (t) for giving a load command to the load device 30.

Here, the load controller 121h has the first subtractor 121a and the first control circuit 121b. The first subtractor 121a subtracts the load power actual value L (t) from the load power desired value Lref (t), to thereby output a deviation signal $e_L$ (t). The first control circuit 121b performs a control calculation based on the deviation signal $e_L$ (t), and calculates the load command calculation value Lcal (t) by the following equation (1).

$$Lcal(t)=F_L(Lref(t),L(t),P_L) \qquad (1)$$

Here, $F_L$ means that Lcal (t) is a function of Lref (t), L (t), and $P_L$.

For example, in a case where the control by the load controller 121h is the PID control, Lcal (t) can be obtained by the following equation (2).

$$Lcal(t)=K_{PL}\cdot e_L(t)+K_{IL}\cdot\textstyle\int e_L(t)dt+K_{DL}\cdot de_L(t)/dt \qquad (2)$$

Here, $K_{PL}$, $K_{IL}$, and $K_{DL}$ are the load control parameters $P_L$ read by the input unit 110 and stored in the control parameter storage 132.

The calculated value of the load command calculation value Lcal (t) is output from the output unit 140 as a load command signal Lset (t) with respect to the local controller 31 of the load device 30.

The part related to the command with respect to the PCS 20 is as follows.

The input unit 110 accepts a planned value Plan-P of the output power, and R being the output power actual value 51a from the output power meter 51. Here, the value of the planned value Plan-P is stored in the planned value storage 131, and used as a reference value PCSref (t) of the output power at each time point. An output controller 121p of the control calculator 121 calculates, based on these signals, the output command calculation value PCScal with respect to the PCS20.

Here, the output controller 121p has a second subtractor 121c and a second control circuit 121d. The second subtractor 121c subtracts the output power actual value PCS (t) from the output power desired value PCSref (t), to thereby output a deviation signal $e_p$ (t). The second control circuit 121c performs a control calculation based on the deviation signal $e_p$ (t), and calculates the output command calculation value PCScal (t) by the following equation (3).

$$PCScal(t)=F_{PCS}(PCSref(t),PCS(t),P_P) \qquad (3)$$

Here, $F_{PCS}$ means that PCScal (t) is a function of PCSref (t), PCS (t), and $P_P$.

For example, in a case where the control by the output controller 121p is the PID control, PCScal (t) can be obtained by the following equation (4).

$$PCScal(t)=K_{PP}\cdot e_P(t)+K_{IP}\cdot\textstyle\int e_P(t)dt+K_{DP}\cdot de_P(t)/dt \qquad (4)$$

Here, $K_{PP}$, $K_{IP}$, and $K_{DP}$ are the output control parameters $P_p$ read by the input unit 110 and stored in the control parameter storage 132.

The command value re-calculator 122 calculates, based on the output command calculation value PCScal (t) calculated by the output controller 121p, the load command calculation value Lcal (t) calculated by the load controller 121h, and a minimum reception power value Rmin housed in the minimum reception power storage 133 of the storage unit 130, the output command value PCSset (t) in order to prevent a reception power value R (t) from the system from becoming less than the minimum reception power value Rmin. Here, the reception power value R (t) is a value obtained by subtracting the output power value PCS (t) from a load power value L (t). The contents of calculation in the command value re-calculator 122 will be described later in detail while citing FIG. 4.

The output command value PCSset (t) calculated by the command value re-calculator 122 is limited by the change rate limiter 123 so that the change rate, namely, a rate of change of the value becomes a predetermined value or less, and then output as the output command value PCSset (t) to the PCS 20 from the output unit 140.

FIG. 4 is a conceptual graph for explaining details of re-calculation of the output command value in a reverse flow power control method according to the first embodiment. A horizontal axis indicates a time, and a vertical axis indicates each electric power (kW). $\Delta t$ is a time width of a control step, namely, a control period. FIG. 4 illustrates a case where a calculation period, namely, a calculation step time width matches the control period $\Delta t$. Specifically, actual values of respective powers are obtained at a time t, and after performing the calculation, a command value is output at the next control step time (t+$\Delta t$). Details will be described hereinbelow.

First, regarding the load power, the load command value Lset (t) is calculated by the load controller 121$h$. As described above, upon receiving the load command value Lset (t), the local controller 31 of the load device 30 performs control so that a load power value L (t+$\Delta t$) used by the load device 30 matches the value of the load command value Lset (t). Therefore, at the next control step time (t+$\Delta t$), the value of the load power value L (t+$\Delta t$) can be approximated to the value of the load command value Lset (t). Here, a rising width of the load power after $\Delta t$ (L (t+$\Delta t$)–L (t)) will be described as $\Delta L$.

In the same way, regarding the output power, the output command calculation value PCScal (t) is calculated by the output controller 121$p$. As described above, when the PCS 20 receives the output command of this value, it performs control so that an output power value PCS (t+$\Delta t$) matches this value PCScal (t). Therefore, in this case, at the next control step time (t+$\Delta t$), the value of the output power value PCS (t+$\Delta t$) can be approximated to this value PCScal (t). Here, a rising width of the output power after $\Delta t$ in this case (PCS (t+$\Delta t$)–PCS (t)) will be described as APCS.

Here, the command value re-calculator 122 calculates, based on the command values capable of being approximated as respective prediction values at the next control step time (t+$\Delta t$), namely, the load command value Lset (t) and the output command calculation value PCScal (t), and the reception power value R (t), the PCS output command value PCSset (t) being an output command value that prevents the prediction value R (t) of the reception power from becoming less than the minimum reception power value Rmin.

Concretely, the PCS output command value PCSset (t) is calculated by the following equation (5).

$$PCSset(t)=H(PCScal(t),PCS(t),Lcal(t),L(t),R(t),Rmin) \quad (5)$$

Here, the equation (5) can be represented as the following equation (6).

$$PCSset(t) = \quad (6)$$

$$PCS(t) + \min(-\Delta L + \Delta PCS, R(t) - Rmin) + \Delta L = PCS(t) + \min$$

$$(-\{Lcal(t) - L(t)\} + \{PCSset(t) - PCS(t)\}, R(t) - Rmin) + \{Lcal(t) - L(t)\}$$

FIG. 5 is a flow chart illustrating a procedure of the reverse flow power control method according to the first embodiment. Hereinafter, the procedure of the reverse flow power control method will be described while citing FIG. 5.

First, reading of parameters is performed (step S10). Concretely, the input unit 110 reads the load control parameter $P_L$, and the control parameter storage 132 stores the parameter (step S11). Further, the input unit 110 reads the output control parameter Pp, and the control parameter storage 132 stores the parameter (step S12). Further, the input unit 110 reads the minimum reception power value Rmin, and the minimum reception power storage 133 stores the value (step S13).

Next, the other external data is read (step S20). Concretely, the input unit 110 reads the load planned value Plan-L and the output planned value Plan-P, and the planned value storage 131 stores the values (step S21). Further, the input unit 110 accepts the load power actual value L (t) and the output power actual value PCS (t) as the power actual values, and the actual value storage 134 stores the values (step S22). Note that the reception power value R (t) obtained by subtracting the output power actual value PCS (t) from the load power actual value L (t) is also housed in the actual value storage 134.

Next, the control calculator 121 of the calculator 120 calculates the command values (step S30). Concretely, the load controller 121$h$ of the control calculator 121 calculates the load command calculation value Lcal (t) (step S31). The obtained load command calculation value Lcal (t) is output as the load command value Lset (t) to the local controller 31 of the load device 30, as will be described later (step S60).

Further, the output controller 121$p$ of the control calculator 121 calculates the output command value calculation value PCScal (t) (step S32). These calculated load power command value Lset (t) and output command value calculation value PCScal (t), and the reception power value R (t) obtained by subtracting the output command value calculation value PCScal (t) from the load command calculation value Lcal (t), are housed and stored in the command value calculation result storage 135.

Next, the command value re-calculator 122 performs re-calculation by using the respective power actual values housed in the actual value storage 134 and the calculation result housed in the command value calculation result storage 135, to thereby calculate the PCS output command value PCSset (t) (step S50). This result is output as the output command value PCSset (t) to the PCS 20 from the output unit 140 via the change rate limiter 123. Further, the load command calculation value Lcal (t) obtained in step S30 is output as the load command value Lset (t) to the local controller 31 of the load device 30 (step S60).

Although the calculator 120 described above performs the calculation regarding absolute values of the load power and the output power, namely, the values of the load power and the output power themselves, the calculation is not limited to this. For example, it is possible that change amounts from the actual values ($\Delta L$, $\Delta PCS$, and the like) are calculated, instead of the load power command value Lset (t), the output command value calculation value PCScal (t), and the output command value PCSset (t), and absolute values of the load power command value and the output power command value are calculated in the output unit 140. The calculation by the change amounts, not the absolute values of the command calculation value and the command value as described above can further simplify the calculation.

Note that the above-described embodiment describes a case, as an example, in which the output command value PCSset (t) is calculated by using the min function based on one minimum reception power value Rmin, but the embodiment is not limited to this. For example, it is possible that a plurality of threshold values as a substitute for the minimum reception power are read by the input unit 110 and then housed in the minimum reception power storage 133, change amounts up to the respective threshold values are calculated, and the command value re-calculator 122 calculates an average value, a median value, or a maximum value of the change amounts.

As described above, according to the reverse flow power control device 100 in the present embodiment, in each control step, the control calculation result is not output as it is to the PCS 20, but the re-calculation is performed in order to prevent the reception power value R (t) from becoming less than the minimum reception power value Rmin. As a result of this, it is possible to prevent the reverse flow from the plant 1 to the power system 2.

Second Embodiment

Figure 6:
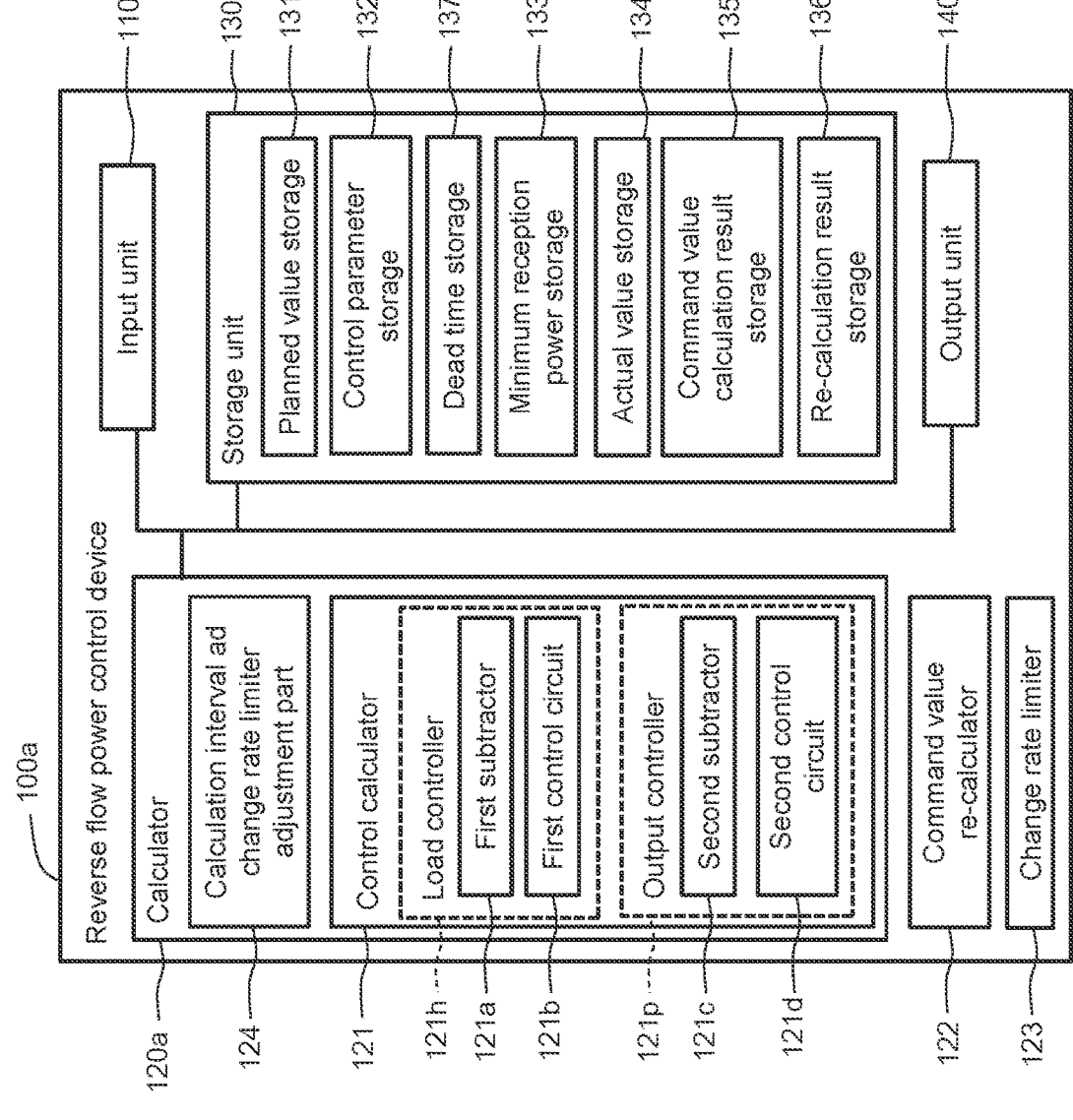
FIG. 6 is a block diagram illustrating a configuration of a reverse flow power control device according to a second embodiment.

FIG. 6 is a block diagram illustrating a configuration of a reverse flow power control device 100a according to a second embodiment.

The present embodiment is a modification of the first embodiment, and relates to a case where there exists a dead time in a response of a part or all of the renewable energy power generating device (PV) 10, the power conditioner (PCS) 20, and the load device 30.

In the present embodiment, a calculator 120a further has a calculation interval adjustment part 124, and a storage unit 130a further has a dead time storage 137.

The input unit 110 accepts dead time DLi information as an external input, and the dead time storage 137 stores this information. Further, the actual value storage 134 stores respective pieces of power actual value data of at least (M+1) times of calculation to be described later. Here, when there exists the dead time DLi information (i=1 to 3) of each of the PV 10, the PCS 20, and the load device 30, a maximum value thereof is set as the dead time DL.

The calculation interval adjustment part 124 calculates, based on the dead time DL and a normal calculation time interval $\Delta$tn, a calculation interval $\Delta$t by using the following equation (7) and equation (8).

$$M = \text{ROUND}(DL/\Delta tn, 0) \tag{7}$$

$$\Delta t = DL/M \tag{8}$$

Here, ROUND (DL/$\Delta$tn, 0) is for rounding up digits after a decimal point of a numeric value of (DL/$\Delta$tn) to form an integer.

Figure 7:
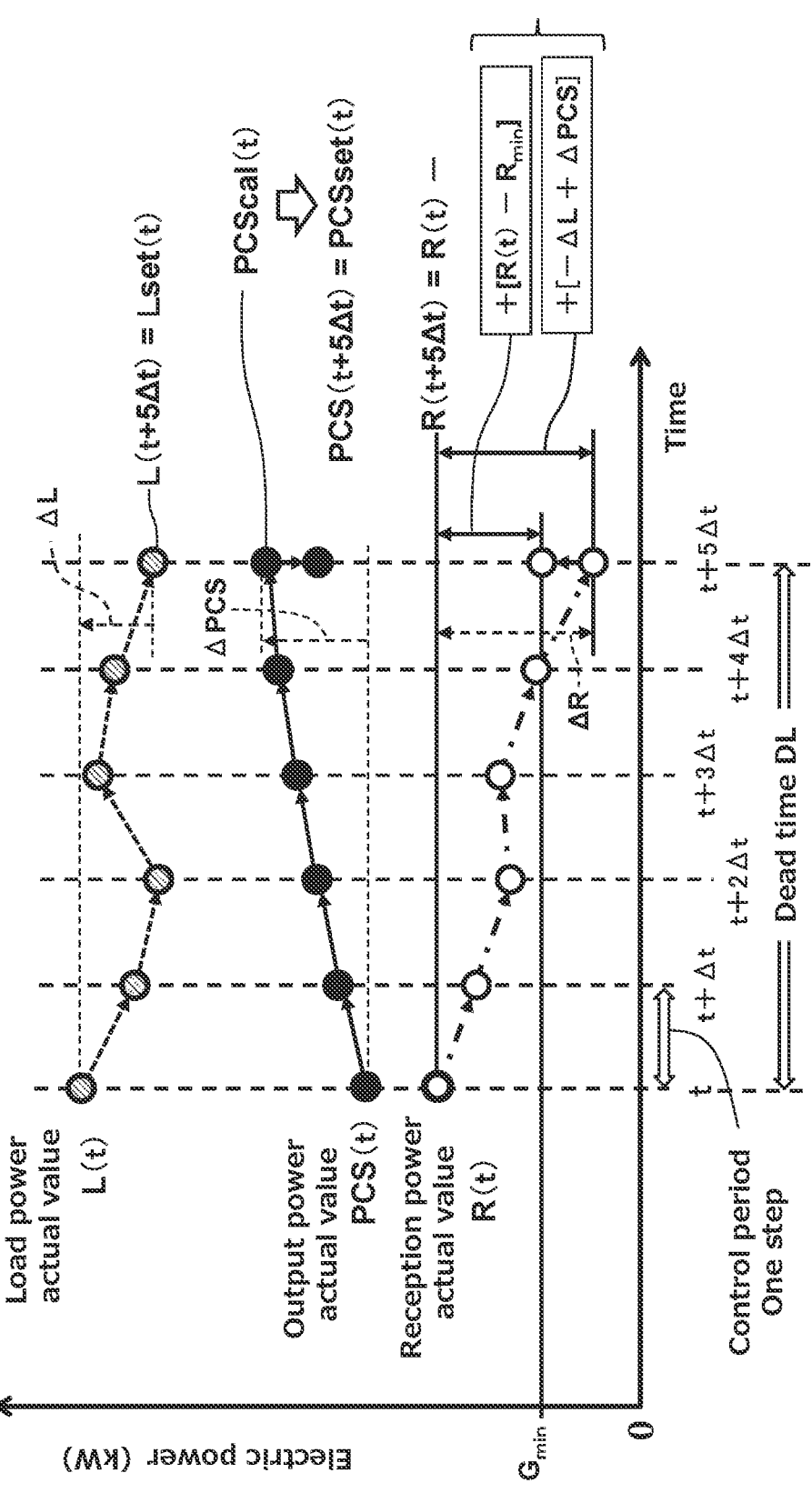
FIG. 7 is a conceptual graph for explaining details of re-calculation of an output command value in a reverse flow power control method according to the second embodiment.

FIG. 7 is a conceptual graph for explaining details of re-calculation of an output command value in a reverse flow power control method according to the second embodiment.

FIG. 7 illustrates a case, as an example, in which a calculation of five steps is performed regarding the dead time DL, namely, the above-described (M+1) is 5.

The second embodiment is different from the first embodiment in that it performs a calculation of the load command calculation value Lcal by the load controller 121h, a calculation of the output command calculation value PCScal by the output controller 121p, and a calculation of the reception power value R, at the initial four steps, as represented by the following equation (9) to equation (12), and then performs a calculation of output command in the command value re-calculator 122 after the lapse of dead time, namely, at the fifth step, as represented by the following equation (13).

$$Rm(t + \Delta t) = R(t) + Lcal(t - 4\Delta t) - PCScal(t - 4\Delta t) \tag{9}$$

$$Rm(t + 2\Delta t) = Rm(t + \Delta t) + Lcal(t - 3\Delta t) - PCScal(t - 3\Delta t) \tag{10}$$

$$Rm(t + 3\Delta t) = Rm(t + 2\Delta t) + Lcal(t - 2\Delta t) - PCScal(t - 2\Delta t) \tag{11}$$

$$Rm(t + 4\Delta t) = Rm(t + 3\Delta t) + Lcal(t - \Delta t) - PCScal(t - \Delta t) \tag{12}$$

$$PCSset = PCScal(t - \Delta t) + \tag{13}$$

$$\min(-\{Lcal(t) - Lcal(t - \Delta t)\} + \{PCScal(t) - PCScal(t - \Delta t]\},$$

$$Rm(t + 4\Delta t) - Rmin + \{Lcal(t) - Lcal(t - \Delta t)\}$$

Note that when the above is generalized, in a case where the dead time includes T steps, future reception power is calculated by the following equation (14), and the PCS output command value PCSset (t) is calculated by the equation (15).

$$Rm(t + (\tau - 1)\Delta t) = Rm(t + (\tau - 2)\Delta t) + Lcal(t - \Delta t) - PCScal(t - \Delta t) \tag{14}$$

$$PCSset(t) = PCScal(t - \Delta t) + \tag{15}$$

$$\min(-\{Lcal(t) - Lcal(t - \Delta t)\} + \{PCScal(t) - PCScal(t - \Delta t),$$

$$Rm(t + (\tau - 1)\Delta t) - Rmin + \{Lcal(t)Lcal - (t - \Delta t)\}$$

Note that although the above-described embodiment describes a case, as an example, in which the dead time in the load device 30 and the dead time in the PCS 20 are the same, but even in a case where the values of the dead time are mutually different, it is possible to perform processing in a similar manner.

However, when the load device 30 and the PCS 20 have mutually different dead time, it is desirable that the dead time in the PCS 20 is shorter than that in the load device 30.

As described above, in the present embodiment, even if the dead time is large, it is possible to prevent the reception power value Rm (t) from becoming less than the minimum reception power value Rmin.

Third Embodiment

Figure 8:
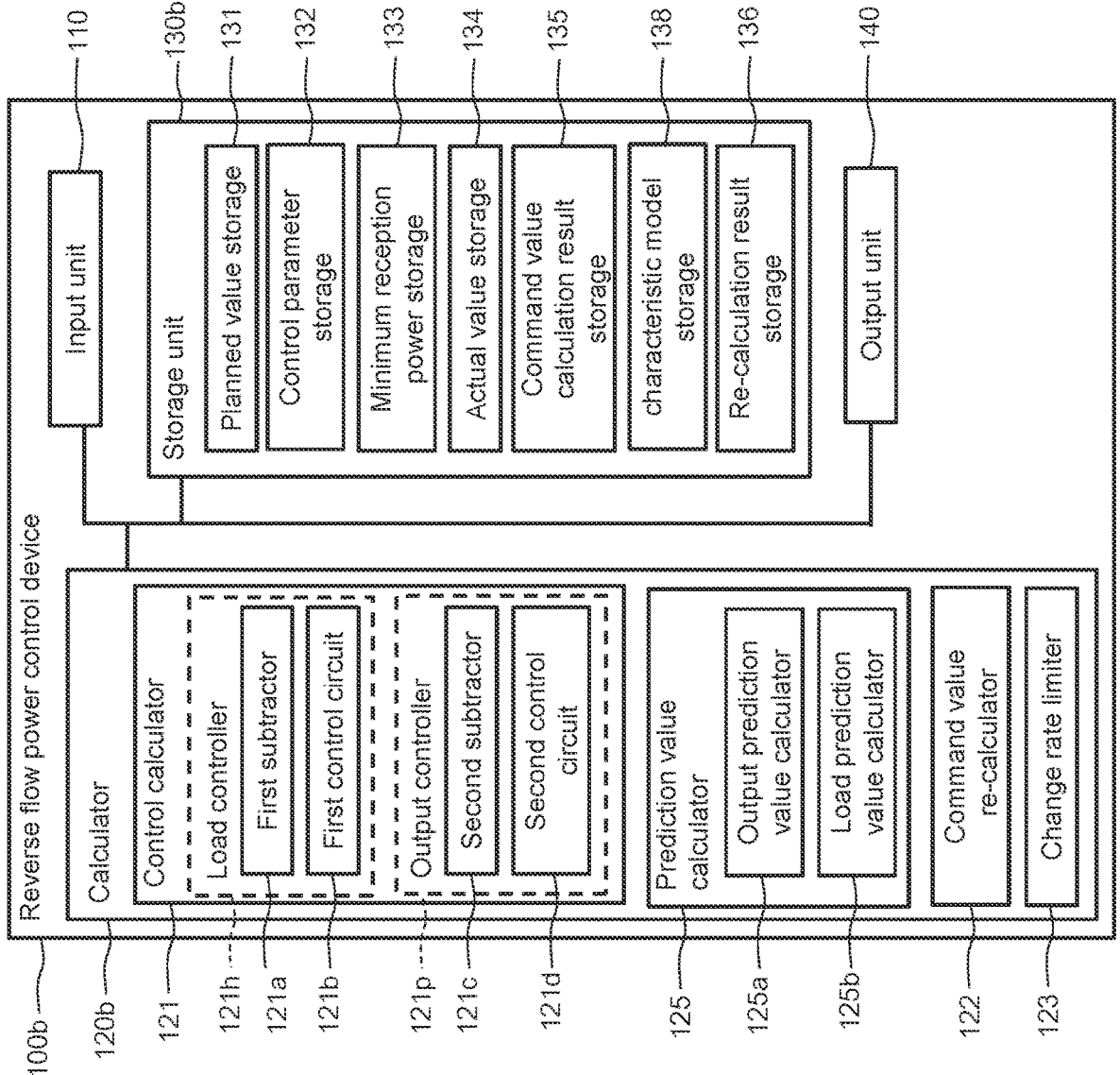
FIG. 8 is a block diagram illustrating a configuration of a reverse flow power control device according to a third embodiment.

FIG. 8 is a block diagram illustrating a configuration of a reverse flow power control device 100b according to a third embodiment.

The present embodiment is a modification of the first embodiment, and takes a response characteristic of each of the renewable energy power generating device (PV) 10, the power conditioner (PCS) 20, and the load device 30 into consideration.

In the present embodiment, the input unit 110 accepts characteristic models obtained by modeling these response characteristics, as an external input. A storage unit 130b further has a characteristic model storage 138 that stores these characteristic models. Further, a calculator 120b further has a prediction value calculator 125 that calculates prediction values of response by using these characteristic models. The prediction value calculator 125 has an output prediction value calculator 125a and a load prediction value calculator 125b.

Each characteristic model may be a single characteristic table or a combination of characteristic tables. Alternatively, a calculation of an output prediction value PCSpd (t+Δt) by the output prediction value calculator 125a and a calculation of a load prediction value Lpd (t+Δt) by the load prediction value calculator 125b may be performed by the form of functions as represented by the following equation (16) and equation (17), respectively.

$$\text{PCSpd}(t+\Delta t)=F_P(\text{PCScal}(t),q_P) \tag{16}$$

$$\text{Lpd}(t+\Delta t)=F_L(\text{Lcal}(t),q_L) \tag{17}$$

Here, $q_P$ and $q_L$ are a set of constants related to respective characteristics (characteristic constants). For example, they are a time constant and a gain in a case of first-order lag or second-order lag.

Note that the calculation of the output prediction value PCSpd (t+Δt) by the output prediction value calculator 125a and the calculation of the load prediction value Lpd (t+Δt) by the load prediction value calculator 125b are not limited to be performed as described above and may be performed linearly or nonlinearly as long as it is possible to predict future power with respect to a command value for each device, and it is possible to use, for example, a prediction method of deep learning such as a neural network or a random forest using a tree structure.

Figure 9:
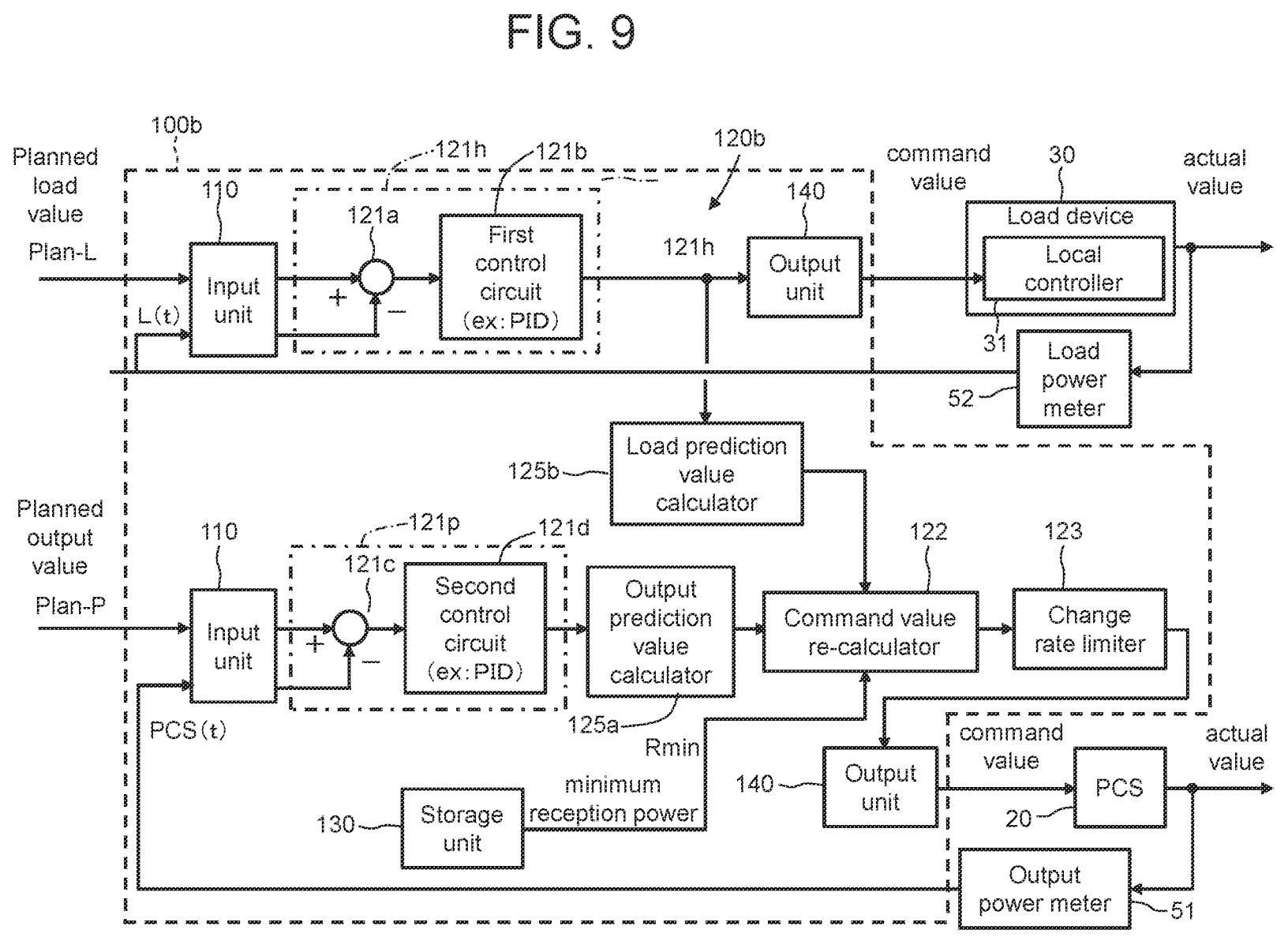

FIG. 9 is a control block diagram illustrating a configuration and operations of the reverse flow power control device 100b according to the third embodiment.

Regarding a part related to a command with respect to the load device 30, the load controller 121h of the control calculator 121 calculates the load command calculation value Lcal (t), and the output unit 140 outputs this value as the load command value Lset (t), to thereby enable operations similar to those of the first embodiment.

On the other hand, regarding a part related to a command with respect to the PCS 20, a part different from that of the first embodiment will be described below.

Firstly, the load prediction value calculator 125b calculates the load prediction value Lpd (t+Δt) by using the load command calculation value Lcal (t) calculated by the load controller 121h.

Secondly, the output prediction value calculator 125a calculates the output prediction value PCSpd (t+Δt) by using the output command calculation value PCScal (t) calculated by the output controller 121p.

Thirdly, the command value re-calculator 122 calculates, based on respective prediction values at the next control step time (t+Δt), namely, the load prediction value Lpd (t+Δt) and the output prediction value PCSpd (t+Δt), and the reception power value R (t), the PCS output command value PCSset (t) being an output command value that prevents the prediction value R (t+Δt) of the reception power from becoming less than the minimum reception power value Rmin.

Concretely, the PCS output command value PCSset (t) is calculated based on the respective prediction values by using the following equation (18), instead of the equation (5) in the first embodiment.

$$\text{PCSset}(t)=H(\text{PCSpd}(t),PCS(t),\text{Lpd}(t),L(t),R(t),\text{Rmin}) \tag{18}$$

Here, if the same method of thinking as the first embodiment is tried to be applied strictly, there is a need to use an inverse function of PCSpd (t) and PCS (t) for the output command value PCSset (t) that prevents the prediction value R (t+Δt) of the reception power from becoming less than the minimum reception power value Rmin, but the processing becomes complicated, and further, realistically speaking, it can be considered that the control response and the response characteristic related to the PV 10, the PCS 20, and the load device 30 can be ignored when seen from the reverse flow power control device 100 side. In such a case, by correcting an amount of ΔR (refer to FIG. 4) from the output prediction value PCSpd (t) as in the following equation (19), it is possible to obtain the PCS output command value PCSset (t).

$$\text{PCSset}(t)=\text{PCSpd}(t+\Delta t)-\Delta R \tag{19}$$

FIG. 10 is a flow chart illustrating a procedure of a reverse flow power control method according to the third embodiment. The procedure up to step S30 is similar to that of the first embodiment. Hereinbelow, only a part different from that of the first embodiment will be described.

The present embodiment further has a prediction value calculation step (step S40). Specifically, the load prediction value calculator 125b performs a load power prediction value calculation to calculate a load prediction value Lpd (t+Δt) (step S41), and the output prediction value calculator 125a performs an output power prediction value calculation to calculate an output prediction value PCSpd (t+Δt) (step S42).

Further, in an output command value re-calculation step S50a in the present embodiment, the PCS output command value PCSset (t) is calculated based on the respective prediction values by using the equation (19), instead of the equation (5) in the first embodiment.

As described above, according to the present embodiment, it is possible to obtain an effect similar to that of the first embodiment. Further, by predicting future power by using the models of the respective devices, an influence due to the characteristics of the respective devices can be considered, which enables to further securely reduce the possibility that the reception power becomes less than the minimum reception power.

Fourth Embodiment

Figure 11:
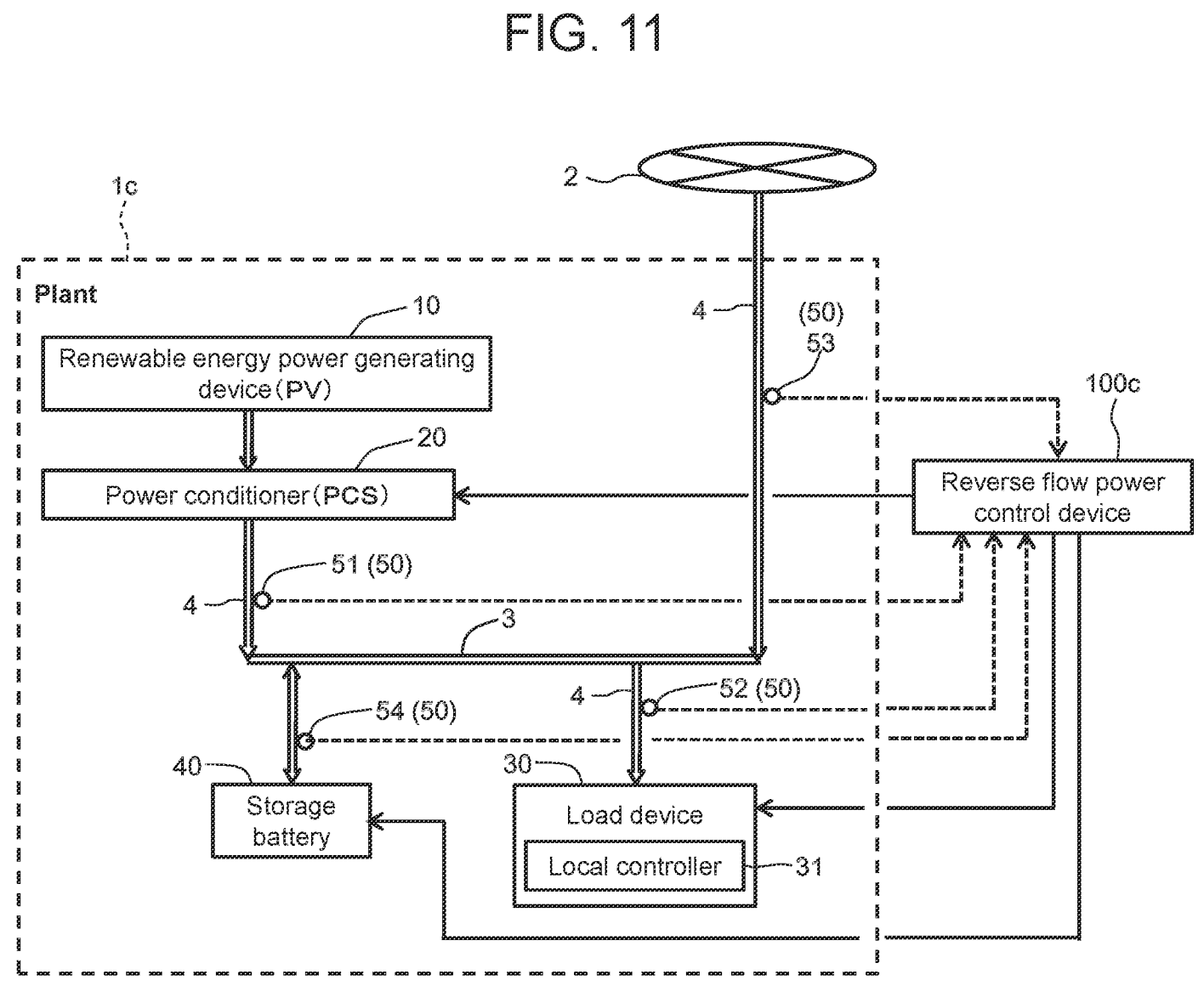

FIG. 11 is a block diagram illustrating a relationship between a reverse flow power control device 100c according to a fourth embodiment and a plant 1c targeted by the reverse flow power control device 100c.

The present embodiment is a modification of the first embodiment, and the plant 1c further has a storage battery 40 and a charge/discharge power meter 54.

Figure 12:
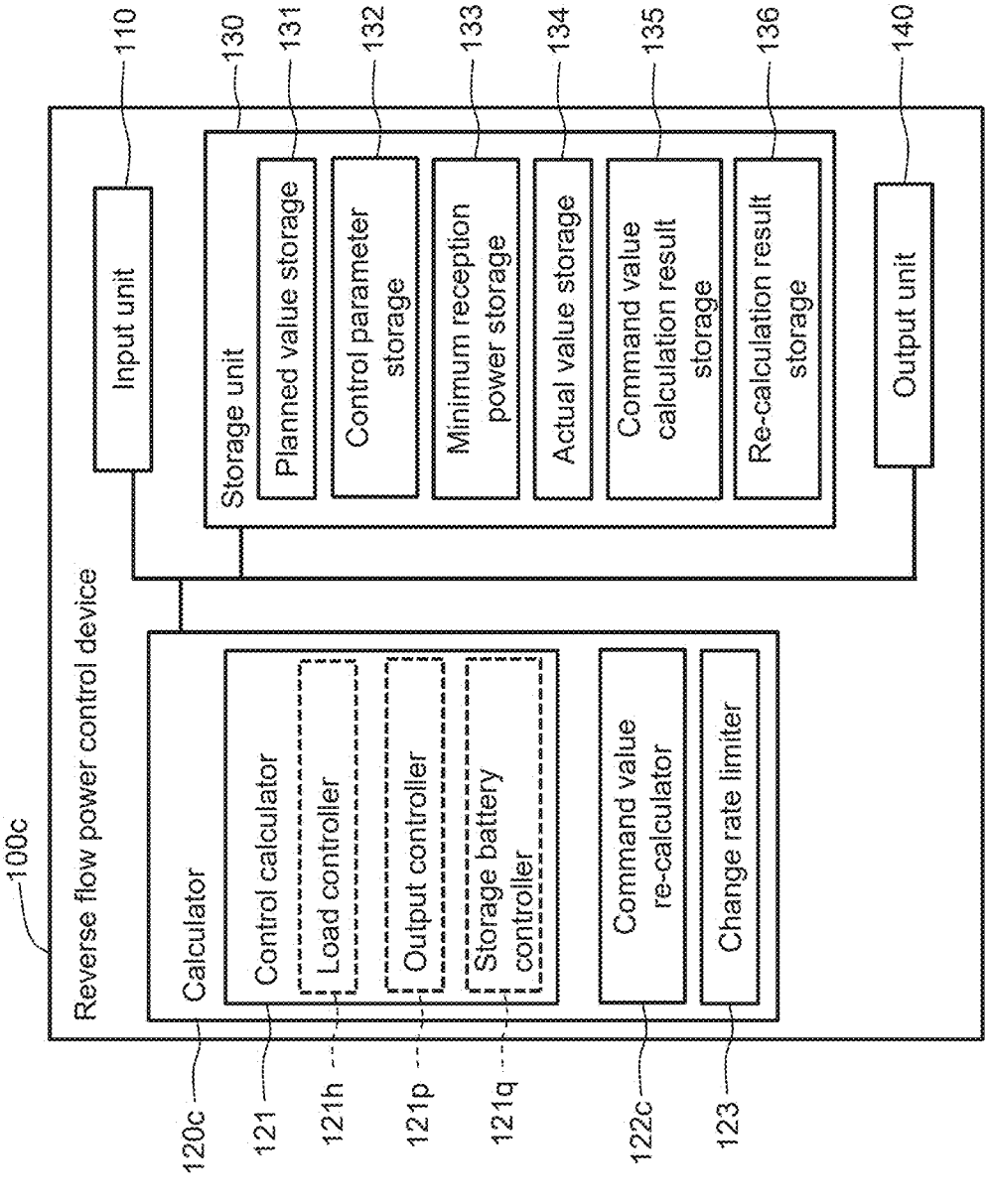
FIG. 12 is a block diagram illustrating a configuration of the reverse flow power control device according to the fourth embodiment.

FIG. 12 is a block diagram illustrating a configuration of the reverse flow power control device 100c according to the fourth embodiment. The reverse flow power control device 100c further has a storage battery controller 121q in the calculator 120c. Further, a command value re-calculator 122c is provided instead of the command value re-calculator 122 in the first embodiment, and a re-calculation target is not the output command value with respect to the PCS 20 in the first embodiment but a charge/discharge command value with respect to the storage battery 40. A part other than the above is similar to that of the first embodiment. Hereinafter, a part different from that of the first embodiment will be mainly described, and an explanation of a part similar to that of the first embodiment will be omitted.

Figure 13:
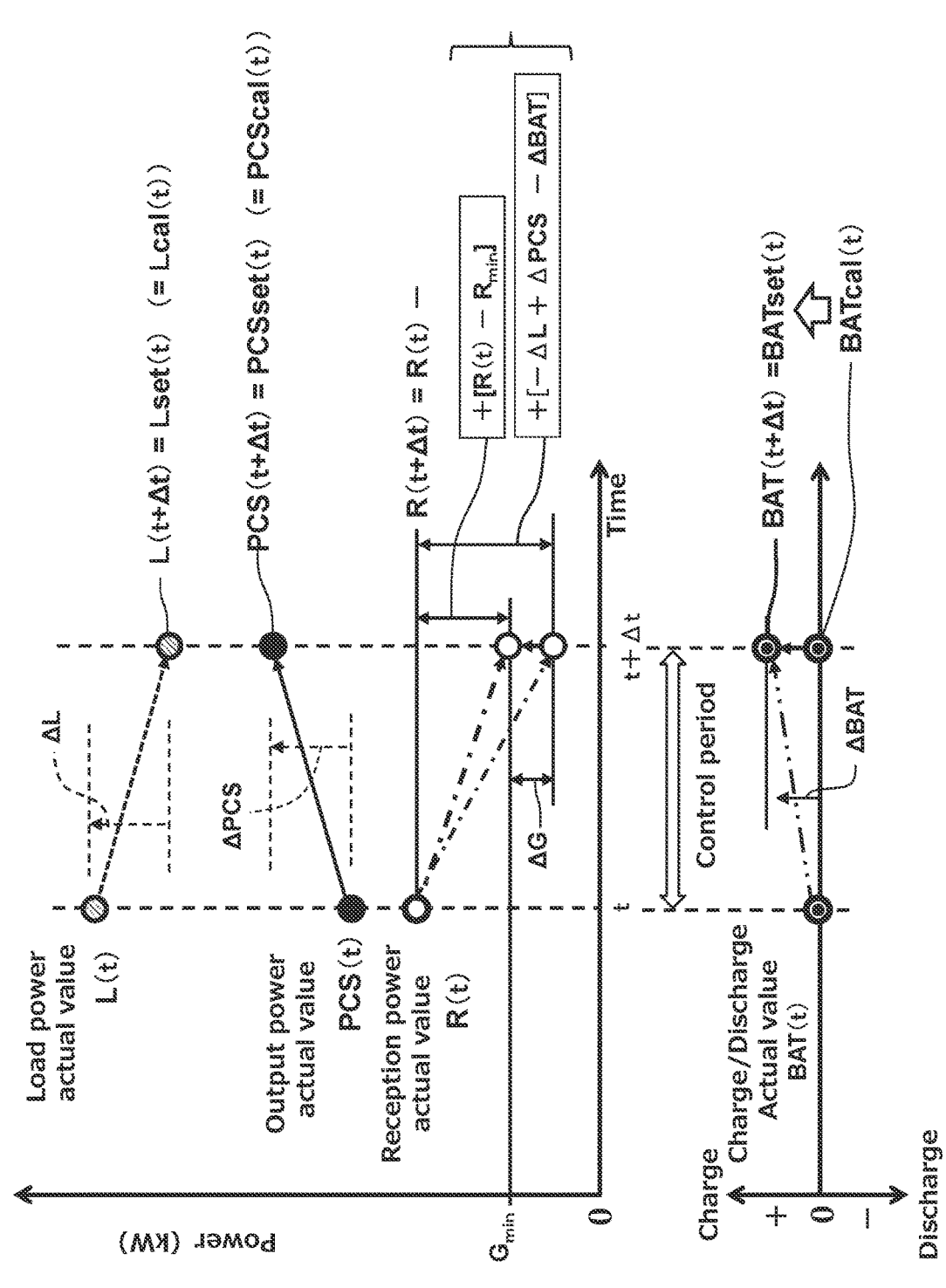
FIG. 13 is a conceptual graph for explaining details of re-calculation of an output command value in a reverse flow power control method according to the fourth embodiment.

FIG. 13 is a conceptual graph for explaining details of re-calculation of an output command value in a reverse flow power control method according to the fourth embodiment.

The output command calculation value PCScal (t) calculated by the output controller 121*p* is output as the output command value PCSset (t) from the output unit 140 to the PCS 20.

The storage battery controller 121*q* calculates a charge/ discharge command calculation value BATcal (t) of the storage battery 40 through a control calculation. Here, a change amount of the charge/discharge command calculation value BATcal (t) with respect to a charge/discharge actual value BAT (t) of the storage battery 40 is set to ABAT. Here, if the change is in the case of charge, ABAT is positive, and if the change is in the case of discharge, ABAT is negative.

The command value re-calculator 122*c* calculates, based on the command values capable of being approximated as respective prediction values at the next control step time (t+$\Delta$t), namely, the load command calculation value Lcal (t), the output command calculation value PCScal (t), and the charge/discharge command calculation value BATcal (t), and the respective actual values, a charge/discharge command value BATset (t) being a charge/discharge command value that prevents the prediction value R (t) of the reception power from becoming less than the minimum reception power value Rmin.

Concretely, the charge/discharge command value BATset (t) is calculated by the following equation (20).

Charge/discharge command value $$BATset(t)=G(PCScal(t),PCS(t),Lcal(t),L(t),$$

$$BATset(t)BAT(t),R(t),Rmin) \tag{20}$$

Here, the equation (20) can be represented as the following equation (21).

$$BATset(t) = BAT(t) - \{Lcal(t) - L(t)\} + \tag{21}$$
$$\{PCSset(t) - PCS(t)\} - \min(-\{Lcal(t) - L(t)\} +$$
$$\{PCSset(t) - PCS(t)\} - \{BATcal(t) - BAT(t)\}, R(t) - Rmin)$$

As described above, in the plant 1*c* targeted by the reverse flow power control device 100*c* according to the present embodiment, the storage battery 40 is provided, so that by charging the power generated by the PV 10 in the storage battery 40 without being suppressed by the PCS 20, the renewable energy can be used maximally.

Regarding such a plant 1*c*, the reverse flow power control device 100*c* according to the present embodiment outputs the charge/discharge command value BATset (t) after re-calculating the command value with respect to the storage battery 40 while setting the minimum reception power value Rmin as a condition. As a result of this, it is possible to avoid a situation in which the reception power value R (t) becomes less than the minimum reception power value Rmin or a reverse flow occurs due to a control delay.

Fifth Embodiment

Figure 14:
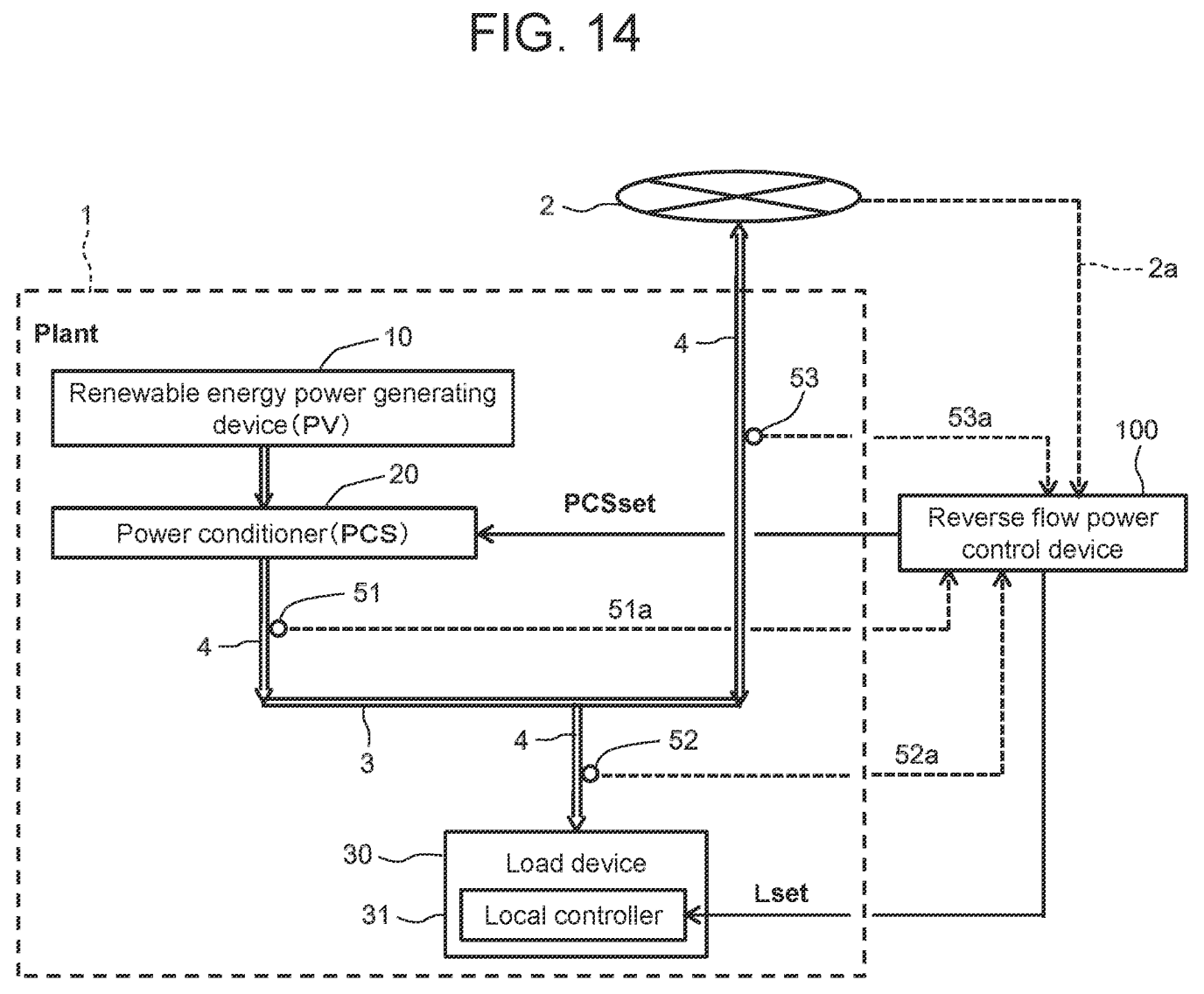

FIG. 14 is a block diagram illustrating a relationship between a reverse flow power control device 100*d* according to a fifth embodiment and a plant 1 targeted by the reverse flow power control device 100*d*.

The present embodiment is a modification of the first embodiment, and is an embodiment in a case where reverse flow power from the plant 1 to the power system 2 is allowed under a certain condition. Accordingly, when the reverse flow power is allowed, a reverse flow allowance signal 2*a* is sent from the power system 2 to the reverse flow power control device 100*d*.

Figure 15:
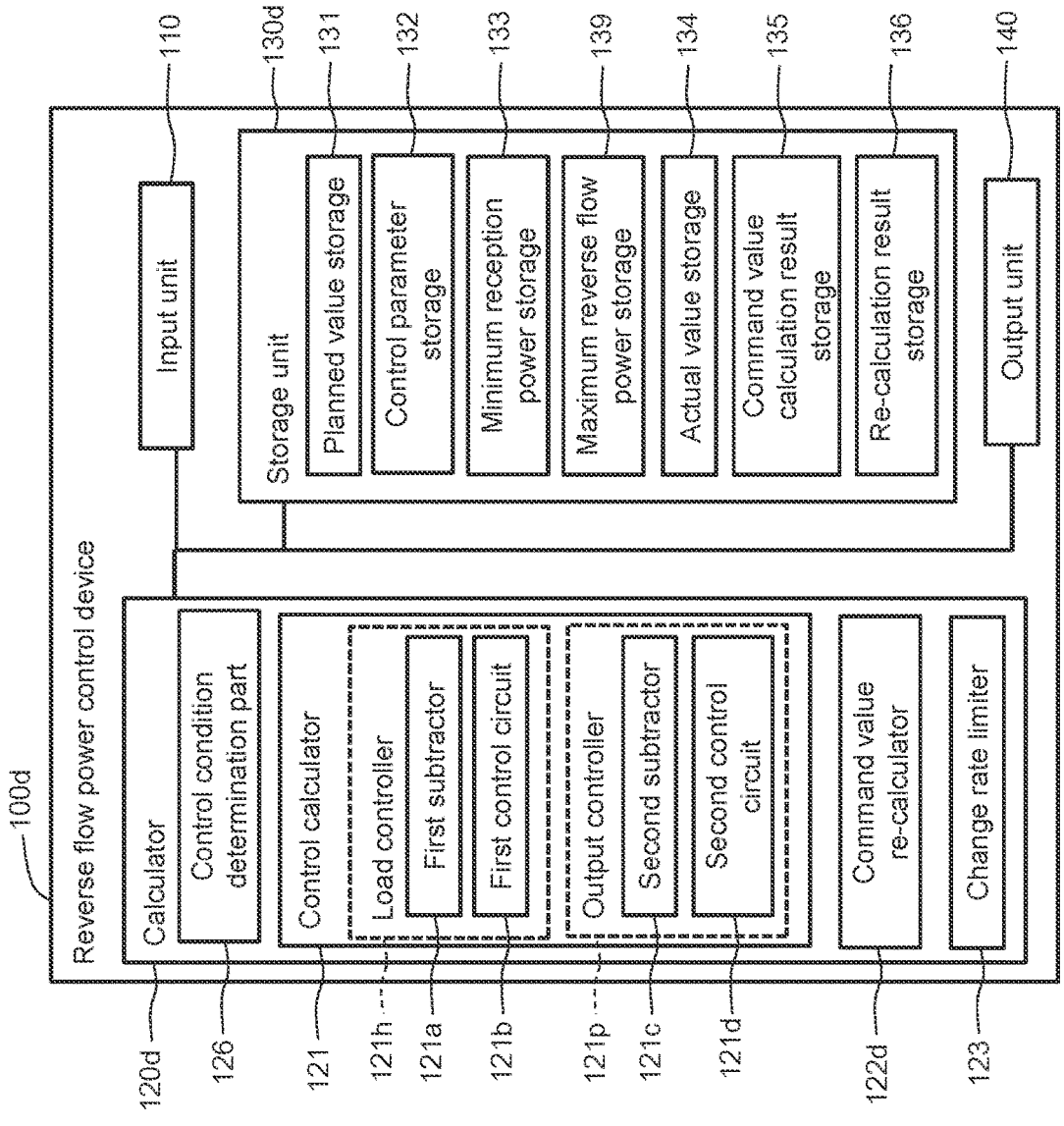
FIG. 15 is a block diagram illustrating a configuration of the reverse flow power control device according to the fifth embodiment.

FIG. 15 is a block diagram illustrating a configuration of the reverse flow power control device 100*d* according to the fifth embodiment.

The input unit 110 accepts the reverse flow allowance signal 2*a* sent from the power system 2. Here, the reverse flow allowance signal 2*a* includes an allowed time zone $\Delta$Tp during which the reverse flow is allowed, and a maximum reverse flow power value Smax being an upper limit value of the reverse flow at that time.

A storage unit 130*d* further has a maximum reverse flow power storage 139 that houses and stores the allowed time zone $\Delta$Tp and the maximum reverse flow power value Smax accepted by the input unit 110.

A calculator 120*d* further has a control condition determination part 126. The control condition determination part 126 designates either of two control states (a first control state and a second control state), based on the allowed time zone $\Delta$Tp and the maximum reverse flow power value Smax housed in the storage unit 130*d*.

A command value re-calculator 122*d* performs processing according to the respective control states.

Firstly, the first control state corresponds to a case where the reverse flow is not allowed, in the same manner as in the first embodiment. Specifically, the command value re-calculator 122*d* calculates, based on the output command calculation value PCScal (t) calculated by the output controller 121*p*, the load command calculation value Lcal (t) calculated by the load controller 121*h*, and the minimum reception power value Rmin housed in the minimum reception power storage 133 of the storage unit 130, the output command value PCSet (t) in order to prevent the reception power value R (t) from the system from becoming less than the minimum reception power value Rmin.

The second control state corresponds to a case where the reverse flow is allowed in the allowed time zone $\Delta$Tp based on the reverse flow allowance signal 2*a* sent from the power system 2. The command value re-calculator 122*d* calculates, based on the output command calculation value PCScal (t) calculated by the output controller 121*p*, the load command calculation value Lcal (t) calculated by the load controller 121*h*, and the maximum reverse flow power value Smax housed in the maximum reverse flow power storage 139 of the storage unit 130, the output command value PCSset (t) using the following equation (22), in order to prevent reverse flow power S (t) with respect to the system from exceeding the maximum reverse flow power value Smax.

$$PCSset(t)=H(PCScal(t),PCS(t),Lcal(t),L(t),S(t),Smax) \tag{22}$$

Here, the equation (22) can be represented as the following equation (23).

$$PCSset(t) = PCS(t) + \min(-\Delta L + \Delta PCS, S(t) - Smax) + \Delta L = \tag{23}$$
$$PCS(t) + \min(-\{Lcal(t) - L(t)\} + \{PCSset(t) - PCS(t)\},$$
$$S(t) - Smax + \{Lcal(t) - L(t)\}$$

Note that in the above description, the case in which the reverse flow allowance signal 2*a* includes the allowed time zone $\Delta$Tp during which the reverse flow is allowed, and the maximum reverse flow power value Smax being the upper limit value of the reverse flow at that time, is described as an example, but not limited to this. For example, the reverse flow allowance signal 2a from the power system 2 may include only the maximum reverse flow power value Smax. In this case, the control condition determination part 126 can designate the first control state during a period of time in which the reverse flow allowance signal 2a from the power system 2 is not sent, and it can designate the second control state during a period of time in which the signal is sent.

As described above, according to the present embodiment, even in a case where the reverse flow is allowed, it is possible to prevent the reverse flow power from exceeding the maximum reverse flow power value Smax due to the control delay, by re-calculating the output command value PCSset (t) with respect to the PCS 20 by using the maximum reverse flow power value Smax included in the reverse flow allowance signal 2a acquired from the power system 2.

According to the embodiments described above, it becomes possible to prevent the deviation from the condition regarding the reverse flow power.

While certain embodiments of the present invention have been described above, these embodiments have been presented by way of example only, and are not intended to limit the scope of the inventions. The characteristics of the respective embodiments may be combined. For example, the characteristic of the second embodiment may be combined with any characteristic of the third to fifth embodiments or with all characteristics of the third to fifth embodiments. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . plant, 2 . . . power system, 2a . . . maximum reverse flow power, 3 . . . in-plant busbar, 4 . . . connection line, 10 . . . renewable energy power generating device (PV), 20 . . . power conditioner (PCS), 30 . . . load device, 31 . . . local controller, 40 . . . storage battery, 50 . . . power meter, 51 . . . output power meter, 51a . . . output power actual value, 52 . . . load power meter, 52a . . . load power actual value, 53 . . . transaction power meter, 53a . . . transaction power actual value, 54 . . . charge/discharge power meter, 54a . . . charge/discharge power actual value, 100 . . . reverse flow power control device, 110 . . . input unit, 120 . . . calculator, 121 . . . control calculator, 121a . . . first subtractor, 121b . . . first control circuit, 121c . . . second subtractor, 121d . . . second control circuit, 121h . . . load controller, 121p . . . output controller, 121q . . . storage battery controller, 122 . . . command value re-calculator, 123 . . . change rate limiter, 124 . . . calculation interval adjustment part, 125 . . . prediction value calculator, 125a . . . output prediction value calculator, 125b . . . load prediction value calculator, 126 . . . control condition determination part, 130 . . . storage unit, 131 . . . planned value storage, 132 . . . control parameter storage, 133 . . . minimum reception power storage, 134 . . . actual value storage, 135 . . . command value calculation result storage, 136 . . . re-calculation result storage, 137 . . . dead time storage, 138 . . . characteristic model storage, 139 . . . maximum reverse flow power storage, 140 . . . output unit

16

What is claimed is:

1. A reverse flow power control device that prevents occurrence of reverse flow power from a plant having a renewable energy power generating device, a power conditioner capable of adjusting output power of the renewable energy power generating device, and a load device, and connected to an external power system, to the power system, the reverse flow power control device comprising:

a storage that stores a planned value of the output power of the renewable energy power generating device, a planned value of a load power supplied to the load device, and a minimum reception power value being a minimum value of a reception power received by the plant from the power system;

an output controller that generates an output command calculation value based on a received actual value of the output power measured at output of the renewable energy power generating device and the planned value of the output power;

a load controller that generates a load command calculation value to control a load of the load device based on a received actual value of the load power measured at input of the load device and the planned value of the load power, and outputs the load command calculation value to the load device;

a command value re-calculator that generates an output command to control the power conditioner based on the received actual value of the output power, the received actual value of the load power, the output command calculation value, the load command calculation value, and the minimum reception power value, in order to prevent a reception power value being a value of the reception power from becoming less than the minimum reception power value, and outputs the output command to the power conditioner; and a calculation interval adjustment part that sets a calculation interval of generating a plurality of calculation steps, regarding a dead time in the renewable energy power generating device, the power conditioner, and the load device; and wherein:

the command value re-calculator calculates a change in the reception power value in an interval up to an end of the plurality of calculation steps in which a command value is reflected by the dead time, and generates the output command that prevents the reception power value from becoming less than the minimum reception power value.

2. The reverse flow power control device according to claim 1, wherein:

the storage further stores received characteristic models obtained by modeling response characteristics of the renewable energy power generating device, the power conditioner, and the load device;

the reverse flow power control device further includes an output prediction value calculator and a load prediction value calculator that calculate an output prediction value and a load prediction value, respectively, based on the output command calculation value, the load command calculation value, and the characteristic models; and the command value re-calculator generates the output command further based on the output prediction value, and the load prediction value, in order to prevent the reception power value from becoming less than the minimum reception power value.

3. The reverse flow power control device according to claim 1, wherein:

the storage stores a plurality of threshold values in addition to the minimum reception power value; and the command value re-calculator generates the output command further based on the plurality of threshold values in order to prevent the reverse flow power.

4. The reverse flow power control device according to claim 3, wherein in the calculation using the plurality of threshold values, the command value re-calculator generates the output command based on a maximum value, a minimum value, an average value, or a median value.

5. The reverse flow power control device according to claim 1, wherein the command value re-calculator performs the calculation based on a change amount from the respective actual values.

6. The reverse flow power control device according to claim 1, wherein:

the plant further has a storage battery; and the command value re-calculator generates a charge/discharge command to control the storage battery based on the received actual value of the output power, the received actual value of the load power, the output command calculation value, the load command calculation value, and the minimum reception power value, in order to prevent the reception power value from becoming less than the minimum reception power value.

7. The reverse flow power control device according to claim 1, wherein the plant is allowed to cause a reverse flow to the power system under a condition in which a power value of the reverse flow does not exceed a maximum reverse flow power value, wherein:

in the allowed case, the command value re-calculator generates the output command based on the received actual value of the output power, the received actual value of the load power, the output command calculation value, the load command calculation value, and the minimum reception power value, in order to prevent the power value of the reverse flow from exceeding the maximum reverse flow power value.

8. A reverse flow power control method that prevents occurrence of reverse flow power from a plant having a renewable energy power generating device, a power conditioner capable of adjusting output power of the renewable energy power generating device, and a load device, and connected to an external power system, to the power system, the reverse flow power control method being implemented by a computer and comprising:

storing in a storage of the computer, a planned value of the output power of the renewable energy power generating device, a planned value of a load power supplied to the load device, and a minimum reception power value being a minimum value of a reception power received by the plant from the power system;

generating an output command calculation value based on a received actual value of the output power measured at output of the renewable energy power generating device and the planned value of the output power stored in the storage, in order to prevent a reception power value being a value of the reception power from becoming less than the minimum reception power value; and generating a load command calculation value to control a load of the load device based on a received actual value of the load power measured at input of the load device and the planned value of the load power stored in the storage and outputting the load command calculation value to the load device;

generating an output command to control the power conditioner based on the received actual value of the output power, the received actual value of the load power, the output command calculation value, the load command calculation value and the minimum reception power value in order to prevent a reception power value being a value of the reception power from becoming less than the minimum reception power value, and outputting the output command to the power conditioner; and setting a calculation interval of generating a plurality of calculation steps, regarding a dead time in the renewable energy power generating device, the power conditioner, and the load device, wherein:

the generating of the output command includes calculating a change in the reception power value in an interval up to an end of the plurality of calculation steps in which a command value is reflected by the dead time, and generating the output command value that prevents the reception power value from becoming less than the minimum reception power value.

* * * * *